(12) United States Patent
Adachi

(10) Patent No.: US 8,589,597 B2
(45) Date of Patent: Nov. 19, 2013

(54) COMPUTER HAVING REMOVABLE INPUT/OUTPUT DEVICE

(75) Inventor: Masaharu Adachi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 1078 days.

(21) Appl. No.: 11/710,905

(22) Filed: Feb. 27, 2007

(65) Prior Publication Data

US 2007/0206019 A1    Sep. 6, 2007

(30) Foreign Application Priority Data

Feb. 27, 2006   (JP) .................................. 2006-049965

(51) Int. Cl.
*G06F 3/00* (2006.01)

(52) U.S. Cl.
USPC .................................. 710/15; 710/62; 710/64

(58) Field of Classification Search
None
See application file for complete search history.

(56) References Cited

U.S. PATENT DOCUMENTS

| | | | |
|---|---|---|---|
| 4,823,256 A * | 4/1989 | Bishop et al. .................... | 714/10 |
| 7,103,785 B2 * | 9/2006 | Green et al. .................... | 713/310 |
| 7,480,484 B2 * | 1/2009 | Nam .............................. | 455/3.06 |
| 2001/0011992 A1 * | 8/2001 | Juen et al. ....................... | 345/156 |
| 2004/0268005 A1 * | 12/2004 | Dickie ............................ | 710/303 |
| 2005/0267999 A1 * | 12/2005 | Suematsu et al. ................ | 710/14 |
| 2006/0026326 A1 * | 2/2006 | Hunt et al. ...................... | 710/303 |
| 2006/0035527 A1 * | 2/2006 | Numano ......................... | 439/668 |

FOREIGN PATENT DOCUMENTS

| | | |
|---|---|---|
| GB | 2345988 A | 7/2000 |
| JP | 05-094250 | 4/1993 |
| JP | 08-287011 | 11/1996 |
| JP | 10-097440 | 4/1998 |
| JP | 11-066453 | 3/1999 |
| JP | 11-224143 | 8/1999 |
| JP | 11-259003 | 9/1999 |
| JP | U 3064588 | 9/1999 |
| JP | 2000-089855 | 3/2000 |
| JP | 2001-092560 | 4/2001 |
| JP | 2002-023898 | 1/2002 |
| JP | 2002-027420 | 1/2002 |
| JP | 2002-132381 | 5/2002 |
| JP | 2002-189516 | 7/2002 |
| JP | 2002-244776 | 8/2002 |
| JP | 2002-312068 | 10/2002 |
| JP | 2004-030315 | 1/2004 |
| JP | 2004-078238 | 3/2004 |
| JP | 2004-246634 | 9/2004 |
| TW | 555082 Y | 9/2003 |

OTHER PUBLICATIONS

Office Action issued Mar. 1, 2011, in Japanese Patent Application No. 2006-049965 filed Feb. 27, 2006.
Office Action issued Jun. 14, 2011, in Japanese Patent Application No. 2006-049965 filed Feb. 27, 2006.

* cited by examiner

*Primary Examiner* — Elias Mamo
(74) *Attorney, Agent, or Firm* — Oblon, Spivak, McClelland, Maier & Neustadt, L.L.P.

(57) ABSTRACT

A computer is disclosed that includes a switching part configured to detect connection of an external computer to the computer upon the connection, and to determine, in response to the detection of the connection of the external computer, that the output signal of the external computer be received and output to the output part of the computer.

12 Claims, 41 Drawing Sheets

FIG.4
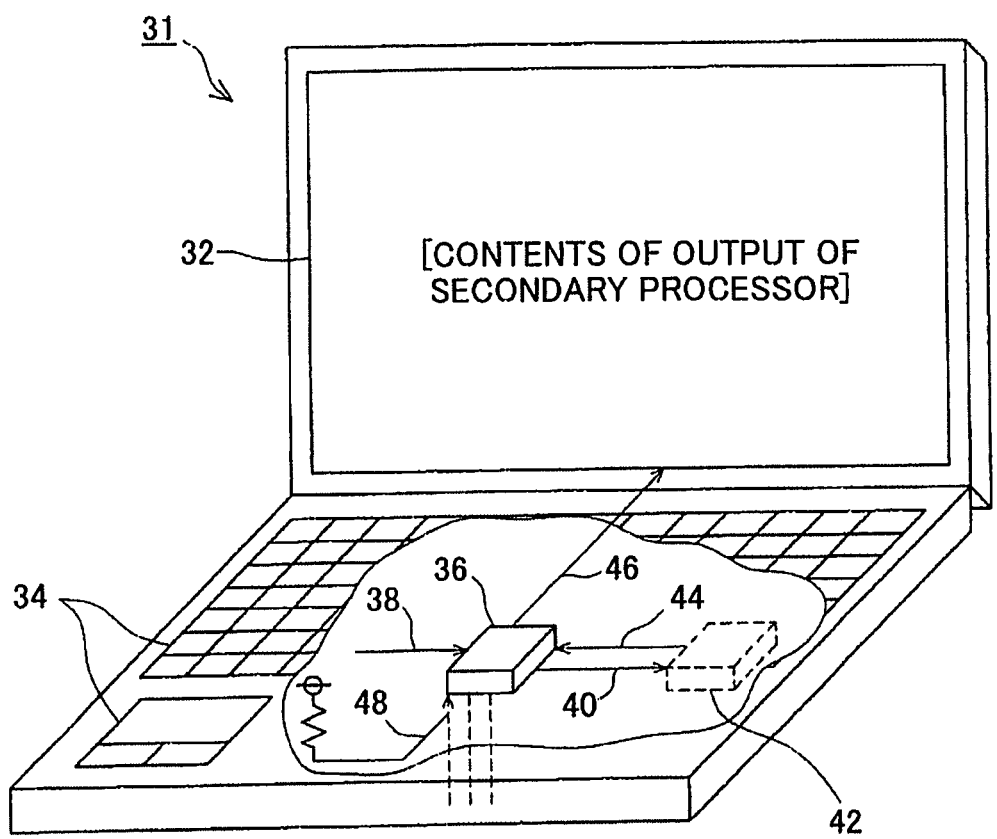
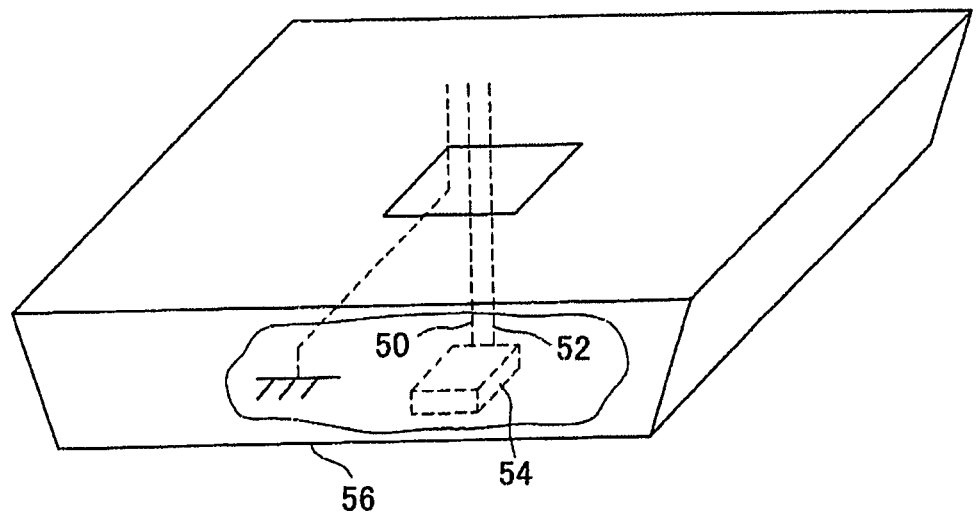

FIG.13

| TERMINAL NO. | TERMINAL NAME | DIRECTION (MAIN BODY– OUTSIDE) | FUNCTION |
|---|---|---|---|
| 1 | Red | → | IMAGE SIGNAL: RED |
| 2 | Green | → | IMAGE SIGNAL: GREEN |
| 3 | Blue | → | IMAGE SIGNAL: BLUE |
| 4 | RESERVED | | RESERVED |
| 5 | GND | — | GROUND |
| 6 | RGND | — | GROUND FOR IMAGE SIGNAL: RED |
| 7 | GGND | — | GROUND FOR IMAGE SIGNAL: GREEN |
| 8 | BGND | — | GROUND FOR IMAGE SIGNAL: BLUE |
| 9 | +5V | → | +5 VDC |
| 10 | SGND | — | GROUND FOR SYNCHRONIZATION SIGNAL |
| 11 | ID0 | ← | MONITOR ID BIT 0 (OPTIONAL) |
| 12 | SDA | ↔ | DDC SERIAL DATA SIGNAL |
| 13 | HSYNC or CSYNC | → | HORIZONTAL OR COMPOSITE SYNCHRONIZATION SIGNAL |
| 14 | VSYNC | → | VERTICAL SYNCHRONIZATION SIGNAL |
| 15 | SCL | ↔ | DDC SERIAL CLOCK SIGNAL |

FIG.14

| TERMINAL NO. | TERMINAL NAME | DIRECTION (MAIN BODY– OUTSIDE) | POST-CHANGE DIRECTION (MAIN BODY– OUTSIDE) | POST-CHANGE FUNCTION |
|---|---|---|---|---|
| 1 | Red | → | ← | IMAGE SIGNAL: RED |
| 2 | Green | → | ← | IMAGE SIGNAL: GREEN |
| 3 | Blue | → | ← | IMAGE SIGNAL: BLUE |
| 4 | RESERVED | | | RESERVED |
| 5 | GND | — | — | GROUND |
| 6 | RGND | — | — | GROUND FOR IMAGE SIGNAL: RED |
| 7 | GGND | — | — | GROUND FOR IMAGE SIGNAL: GREEN |
| 8 | BGND | — | — | GROUND FOR IMAGE SIGNAL: BLUE |
| 9 | +5V | → | ← | +5 VDC |
| 10 | SGND | — | — | GROUND FOR SYNCHRONIZATION SIGNAL |
| 11 | ID0 | ← | → | MONITOR ID BIT 0 (OPTIONAL) |
| 12 | PS/2 DATA | ↔ | ↔ | PS/2 DATA SIGNAL |
| 13 | HSYNC or CSYNC | → | ← | HORIZONTAL OR COMPOSITE SYNCHRONIZATION SIGNAL |
| 14 | VSYNC | → | ← | VERTICAL SYNCHRONIZATION SIGNAL |
| 15 | PS/2 CLK | ↔ | ↔ | PS/2 CLOCK SIGNAL |

FIG.15

| TERMINAL NO. | TERMINAL NAME | DIRECTION (MAIN BODY-OUTSIDE) | POST-CHANGE DIRECTION (MAIN BODY-OUTSIDE) | POST-CHANGE FUNCTION |
|---|---|---|---|---|
| 1 | Red | → | ↓ | IMAGE SIGNAL: RED |
| 2 | Green | → | ↓ | IMAGE SIGNAL: GREEN |
| 3 | Blue | → | ↓ | IMAGE SIGNAL: BLUE |
| 4 | EXTERNAL PC: SDA→PS/2 DATA | | ↔ | EXTERNAL PC: USE AS PS/2 DATA SIGNAL AFTER USING AS SDA TO OBTAIN MONITOR INFORMATION |
| 5 | GND | — | — | GROUND |
| 6 | RGND | — | — | GROUND FOR IMAGE SIGNAL: RED |
| 7 | GGND | — | — | GROUND FOR IMAGE SIGNAL: GREEN |
| 8 | BGND | — | — | GROUND FOR IMAGE SIGNAL: BLUE |
| 9 | +5V | → | ↓ | +5 VDC |
| 10 | SGND | — | — | GROUND FOR SYNCHRONIZATION SIGNAL |
| 11 | EXTERNAL PC: SCL→PS/2 CLK | ← | ↔ | EXTERNAL PC: USE AS PS/2 CLK SIGNAL AFTER USING AS SCL TO OBTAIN MONITOR INFORMATION |
| 12 | SDA→NA | ↔ | ↓ | DDC SERIAL DATA SIGNAL (UNUSED BY EXTERNAL PC) |
| 13 | HSYNC or CSYNC | → | ↓ | HORIZONTAL OR COMPOSITE SYNCHRONIZATION SIGNAL |
| 14 | VSYNC | → | ↓ | VERTICAL SYNCHRONIZATION SIGNAL |
| 15 | SCL→NA | ↔ | | DDC SERIAL CLOCK SIGNAL (UNUSED BY EXTERNAL PC) |

FIG.16

| TERMINAL NO. | TERMINAL NAME | DIRECTION (MAIN BODY-OUTSIDE) | POST-CHANGE DIRECTION (MAIN BODY-OUTSIDE) | POST-CHANGE FUNCTION |
|---|---|---|---|---|
| 1 | Red | → | ↓ | IMAGE SIGNAL: RED |
| 2 | Green | → | ↓ | IMAGE SIGNAL: GREEN |
| 3 | Blue | → | ↓ | IMAGE SIGNAL: BLUE |
| 4 | PS/2 DATA | | ↔ | EXTERNAL PC: PS/2 DATA SIGNAL |
| 5 | GND | — | — | GROUND |
| 6 | RGND | — | — | GROUND FOR IMAGE SIGNAL: RED |
| 7 | GGND | — | — | GROUND FOR IMAGE SIGNAL: GREEN |
| 8 | BGND | — | — | GROUND FOR IMAGE SIGNAL: BLUE |
| 9 | +5V | → | ↓ | +5 VDC |
| 10 | SGND | — | — | GROUND FOR SYNCHRONIZATION SIGNAL |
| 11 | PS/2 CLK | ↓ | ↔ | EXTERNAL PC: PS/2 CLK SIGNAL |
| 12 | SDA | ↔ | ↔ | DDC SERIAL DATA SIGNAL |
| 13 | HSYNC or CSYNC | → | ↓ | HORIZONTAL OR COMPOSITE SYNCHRONIZATION SIGNAL |
| 14 | VSYNC | → | ↓ | VERTICAL SYNCHRONIZATION SIGNAL |
| 15 | SCL | ↔ | ↔ | DDC SERIAL CLOCK SIGNAL |

FIG.21

| TERMINAL NO. | TERMINAL NAME | DIRECTION (MAIN BODY-OUTSIDE) | FUNCTION |
|---|---|---|---|
| 1 | Red | → | IMAGE SIGNAL: RED |
| 2 | Green | → | IMAGE SIGNAL: GREEN |
| 3 | Blue | → | IMAGE SIGNAL: BLUE |
| 4 | RESERVED | — | RESERVED |
| 5 | GND | — | GROUND |
| 6 | RGND | — | GROUND FOR IMAGE SIGNAL: RED |
| 7 | GGND | — | GROUND FOR IMAGE SIGNAL: GREEN |
| 8 | BGND | — | GROUND FOR IMAGE SIGNAL: BLUE |
| 9 | +5V Pull-Up | ← | EXTERNAL PC CONNECTION RECOGNITION SIGNAL (CONNECTED TO GND IN EXTERNAL PC) |
| 10 | SGND | — | GROUND FOR SYNCHRONIZATION SIGNAL |
| 11 | ID0 | ← | MONITOR ID BIT 0 (OPTIONAL) |
| 12 | SDA | ↔ | DDC SERIAL DATA SIGNAL |
| 13 | HSYNC or CSYNC | → | HORIZONTAL OR COMPOSITE SYNCHRONIZATION SIGNAL |
| 14 | VSYNC | → | VERTICAL SYNCHRONIZATION SIGNAL |
| 15 | SCL | ↔ | DDC SERIAL CLOCK SIGNAL |

FIG.22

| TERMINAL NO. | TERMINAL NAME | DIRECTION (MAIN BODY–OUTSIDE) | FUNCTION |
|---|---|---|---|
| 1 | Red | → | IMAGE SIGNAL: RED |
| 2 | Green | → | IMAGE SIGNAL: GREEN |
| 3 | Blue | → | IMAGE SIGNAL: BLUE |
| 4 | ExtPcDetect | ← | EXTERNAL PC CONNECTION RECOGNITION SIGNAL |
| 5 | GND | — | GROUND |
| 6 | RGND | — | GROUND FOR IMAGE SIGNAL: RED |
| 7 | GGND | — | GROUND FOR IMAGE SIGNAL: GREEN |
| 8 | BGND | — | GROUND FOR IMAGE SIGNAL: BLUE |
| 9 | +5V | → | +5 VDC |
| 10 | SGND | — | GROUND FOR SYNCHRONIZATION SIGNAL |
| 11 | ID0 | ← | MONITOR ID BIT 0 (OPTIONAL) |
| 12 | SDA | ↔ | DDC SERIAL DATA SIGNAL |
| 13 | HSYNC or CSYNC | → | HORIZONTAL OR COMPOSITE SYNCHRONIZATION SIGNAL |
| 14 | VSYNC | → | VERTICAL SYNCHRONIZATION SIGNAL |
| 15 | SCL | ↔ | DDC SERIAL CLOCK SIGNAL |

FIG.28

| TERMINAL NO. | TERMINAL NAME | FUNCTION |
|---|---|---|
| 1 | Red | IMAGE SIGNAL: RED |
| 2 | Green | IMAGE SIGNAL: GREEN |
| 3 | Blue | IMAGE SIGNAL: BLUE |
| 4 | ExtOutputEnable | EXTERNAL PC IMAGE SIGNAL ENABLING SIGNAL |
| 5 | GND | GROUND |
| 6 | RGND | GROUND FOR IMAGE SIGNAL: RED |
| 7 | GGND | GROUND FOR IMAGE SIGNAL: GREEN |
| 8 | BGND | GROUND FOR IMAGE SIGNAL: BLUE |
| 9 | ExtPcDetect | EXTERNAL PC CONNECTION RECOGNITION SIGNAL (+5 V PULL-UP) |
| 10 | SGND | GROUND FOR SYNCHRONIZATION SIGNAL |
| 11 | ID0 | MONITOR ID BIT 0 (OPTIONAL) |
| 12 | SDA | DDC SERIAL DATA SIGNAL |
| 13 | HSYNC or CSYNC | HORIZONTAL OR COMPOSITE SYNCHRONIZATION SIGNAL |
| 14 | VSYNC | VERTICAL SYNCHRONIZATION SIGNAL |
| 15 | SCL | DDC SERIAL CLOCK SIGNAL |

FIG.35

| TERMINAL NO. | TERMINAL NAME | FUNCTION |
|---|---|---|
| 1 | Red | IMAGE SIGNAL: RED |
| 2 | Green | IMAGE SIGNAL: GREEN |
| 3 | Blue | IMAGE SIGNAL: BLUE |
| 4 | RESERVED | RESERVED |
| 5 | GND | GROUND |
| 6 | RGND | GROUND FOR IMAGE SIGNAL: RED |
| 7 | GGND | GROUND FOR IMAGE SIGNAL: GREEN |
| 8 | BGND | GROUND FOR IMAGE SIGNAL: BLUE |
| 9 | +5V | +5 VDC |
| 10 | SGND | GROUND FOR SYNCHRONIZATION SIGNAL |
| 11 | ID0 | MONITOR ID BIT 0 (OPTIONAL) |
| 12 | SDA | DDC SERIAL DATA SIGNAL |
| 13 | HSYNC or CSYNC | HORIZONTAL OR COMPOSITE SYNCHRONIZATION SIGNAL |
| 14 | VSYNC | VERTICAL SYNCHRONIZATION SIGNAL |
| 15 | SCL | DDC SERIAL CLOCK SIGNAL |
| E1 | ExtOutputEnable | EXTERNAL PC IMAGE SIGNAL ENABLING SIGNAL (SHORT) |
| E2 | ExtPcDetect | EXTERNAL PC CONNECTION RECOGNITION SIGNAL (LONG) |
| E3 | PS/2 DATA | INPUT DEVICE DATA SIGNAL |
| E4 | PS/2 CLK | INPUT DEVICE CLOCK SIGNAL |
| E5 | GND | GROUND |

FIG.39

| TERMINAL NO. | TERMINAL NAME | FUNCTION |
|---|---|---|
| 1 | Red | IMAGE SIGNAL: RED |
| 2 | Green | IMAGE SIGNAL: GREEN |
| 3 | Blue | IMAGE SIGNAL: BLUE |
| 4 | PS/2 CLK | INPUT DEVICE CLOCK SIGNAL |
| 5 | GND | GROUND |
| 6 | RGND | GROUND FOR IMAGE SIGNAL: RED |
| 7 | GGND | GROUND FOR IMAGE SIGNAL: GREEN |
| 8 | BGND | GROUND FOR IMAGE SIGNAL: BLUE |
| 9 | ExtPcDetect | EXTERNAL PC CONNECTION RECOGNITION SIGNAL (+5 V PULL-UP,LONG) |
| 10 | SGND | GROUND FOR SYNCHRONIZATION SIGNAL |
| 11 | PS/2 DATA | INPUT DEVICE DATA SIGNAL |
| 12 | SDA | DDC SERIAL DATA SIGNAL |
| 13 | HSYNC or CSYNC | HORIZONTAL OR COMPOSITE SYNCHRONIZATION SIGNAL |
| 14 | VSYNC | VERTICAL SYNCHRONIZATION SIGNAL |
| 15 | SCL | DDC SERIAL CLOCK SIGNAL |
| Key | ExtOutputEnable | EXTERNAL PC IMAGE SIGNAL ENABLING SIGNAL (SHORT) |

FIG.41

| TERMINAL NO. | TERMINAL NAME | FUNCTION |
|---|---|---|
| 1 | Red | IMAGE SIGNAL: RED |
| 2 | Green | IMAGE SIGNAL: GREEN |
| 3 | Blue | IMAGE SIGNAL: BLUE |
| 4 | PS/2 CLK | INPUT DEVICE CLOCK SIGNAL |
| 5 | GND | GROUND |
| 6 | RGND | GROUND FOR IMAGE SIGNAL: RED |
| 7 | GGND | GROUND FOR IMAGE SIGNAL: GREEN |
| 8 | BGND | GROUND FOR IMAGE SIGNAL: BLUE |
| 9 | ExtPcDetect | EXTERNAL PC CONNECTION RECOGNITION SIGNAL (+5 V PULL-UP LONG) |
| 10 | SGND | GROUND FOR SYNCHRONIZATION SIGNAL |
| 11 | PS/2 DATA | INPUT DEVICE DATA SIGNAL |
| 12 | SDA | DDC SERIAL DATA SIGNAL |
| 13 | HSYNC or CSYNC | HORIZONTAL OR COMPOSITE SYNCHRONIZATION SIGNAL |
| 14 | VSYNC | VERTICAL SYNCHRONIZATION SIGNAL |
| 15 | SCL | DDC SERIAL CLOCK SIGNAL |

COMPUTER HAVING REMOVABLE INPUT/OUTPUT DEVICE

BACKGROUND OF THE INVENTION

1. Field of the Invention

The present invention relates generally to a highly portable computer reduced in size, weight, and power consumption with a minimum decrease in performance and the system of the computer, and more particularly to a computer that has a removable input/output device with a processor and enables the main-body computer to be remotely controlled via data communications using the input/output device.

2. Description of the Related Art

Primary output devices such as the liquid crystal monitor of a notebook computer and primary input devices such as keyboards and touch pads are fixed to a computer main body and are usually not separable or removable therefrom. That is, these primary input devices and output devices cannot be connected to other computers and used as an input/output device.

As described above, the input device and the output device are not separable from the computer main body, which results in the following inconveniences. First, the entire computer, that is, the CPU, hard disk, etc., of the computer main body that consume large amounts of power are necessary in order to operate the computer main body. This yields low performance with respect to power consumption in the case of operating the computer with a battery where the computer is carried about. Further, the CPU of the computer main body, its heat sink, and the hard disk of the computer main body, which are necessary to operate the computer main body, are heavy. This yields low performance with respect to weight. Further, the CPU of the computer main body, its heat sink, and the hard disk of the computer main body necessary to operate the computer main body are voluminous. This yields low performance with respect to volume. Further, the entire computer is always necessary at the time of use in order to operate the computer main body. Therefore, the entire computer is likely to be stolen particularly in the case of a notebook computer, which is very likely to result in leakage (disclosure) of hard disk data. Further, principal components such as a CPU and a hard disk are closely connected to other components of the computer. Therefore, in order to replace such principal components, it is necessary to take the computer main body apart, which is a very difficult operation.

Further, neither an input device nor an output device in the conventional desktop computer has a processor that autonomously operates. Therefore, even if it is desired that the input or output device be separated from the computer, the input or output device has no function of directly or remotely operating the computer main body.

Regarding the desktop computer, it is often the case that its external devices such as an image display unit such as a liquid crystal display; and input devices such as a keyboard, a touch pad, a mouse, and a trackball are sufficiently usable in terms of function while its internal processor or storage unit has become obsolete with the passage of time. Accordingly, in this case, it is possible to replace only the main body of the desktop computer while continuing to use the image display unit and the input devices.

In the case of the conventional notebook computer, however, if its internal processor or storage unit has become obsolete with the passage of time, the entire notebook computer is no longer usable although its image display unit such as a liquid crystal display and its input devices such as a keyboard, a touch pad, a mouse, and a trackball are often sufficiently operable in terms of function.

Further, in the case of using a notebook computer at an outside location and using a desktop computer back at a base location (for example, an office), an image display unit and an input device are separately required for the desktop computer although the notebook computer has an image display unit and an input device. It is possible for the notebook computer to virtually display an image of the external computer (desktop computer) or make input to the external computer by logging on the desktop computer using a network logon function. However, settings required for this, such as software preparation and settings, and network settings, are complicated. Further, since the connection is established through a network, the connection depends on the condition of the network to be unstable, thus causing a delay in screen display or input operation.

Japanese Laid-Open Patent Application No. 2002-189516 discloses a process control computer system that remotely starts and stops another computer. Japanese Laid-Open Patent Application No. 2002-312068 discloses a notebook personal computer that carries two liquid crystal screens at the same time. This personal computer displays the screen of the computer on an external liquid crystal display unit. Japanese Laid-Open Patent Application No. 2004-246634 discloses an information processing apparatus and an information storage device for the information processing apparatus, that is, discloses a computer removable from a display unit. This technique is for reducing the size and weight of a computer main body. Japanese Laid-Open Patent Application No. 5-94250 discloses a computer in which part of an input device is removable. Japanese Laid-Open Patent Application No. 10-97440 discloses a computer diagnostic apparatus that enables recovery of a primary computer by transmitting the self-diagnosis results of the primary computer to a separable secondary computer and analyzing the self-diagnosis results. Japanese Laid-Open Patent Application No. 11-259003 discloses a space-saving information processor including a computer having a housing as wide as a display unit. Japanese Laid-Open Patent Application No. 2000-89855 discloses an electronic apparatus and a function expansion unit that expands functions of the electronic apparatus by having the electronic apparatus connected thereto. Japanese Utility Model Registration No. 3064588 discloses a connection structure of a signal line of the liquid crystal display of a notebook personal computer for facilitating connection and separation of the signal line of the liquid crystal display and a motherboard. Further, Japanese Patent No. 3283853 discloses a docking station including a function expansion unit that expands functions of an electronic apparatus by having the electronic apparatus connected thereto.

SUMMARY OF THE INVENTION

Embodiments of the present invention may solve or reduce one or more of the above-described problems.

According to one embodiment of the present invention, there is provided a computer in which one or more of the above-described problems may be solved or reduced.

According to one aspect of the present invention, the performance of a computer with respect to power consumption, weight, volume, security, and remote operation at the time of its operation is improved, and the performance of the computer with respect to partial replaceability at the time of failure is improved.

According to one embodiment of the present invention, there is provided a computer including a switching part configured to detect a connection of an external computer to the computer upon the connection, and to determine, in response to the detection of the connection of the external computer, that an output signal of the external computer be received and output to an output part of the computer.

According to one embodiment of the present invention, there is provided a computer, wherein a connection of an external computer to the computer is detected upon the connection, and it is determined, in response to the detection of the connection of the external computer, that a signal input through an input part of the computer be input to the external computer.

According to one embodiment of the present invention, there is provided a computer including a switching part configured to detect a connection of an external computer to the computer upon the connection; and to determine, in response to the detection of the connection of the external computer, that an output signal of the external computer be received and output to an output part of the computer, and a signal input through an input part of the computer be input to the external computer.

According to one embodiment of the present invention, there is provided a computer including a main body and an input/output part including an input part and an output part, wherein the input/output part is removably provided on the main body.

According to one embodiment of the present invention, there is provided a computer including a main body and an input/output part including an input part and an output part, the input/output part being removably provided on the main body, wherein the input/output part includes a processor including a peripheral device controller, the processor having a processing function as a computer, the processor being configured to be remotely connectable to the main body through data communications.

According to one aspect of the present invention, it is possible to improve the performance of a computer with respect to power consumption, weight, volume, security, and remote operation at the time of its operation. Further, it is also possible to improve the performance of the computer with respect to partial replaceability at the time of failure.

BRIEF DESCRIPTION OF THE DRAWINGS

Other objects, features and advantages of the present invention will become more apparent from the following detailed description when read in conjunction with the accompanying drawings, in which:

FIG. 4 is another perspective view (partially exploded view) of the computer including the removable input/output device and the computer main body according to the second and third embodiments of the present invention;

FIG. 13 is a list of assignment of terminals and signals assigned to a VGA connector, which is a conventional interface;

FIG. 14 is a list showing a VGA (VESA DDC) terminal layout according to a seventh embodiment of the present invention;

FIG. 15 is a list showing a VGA (VESA DDC) terminal layout according to an eighth embodiment of the present invention;

FIG. 16 is a list showing a VGA (VESA DDC) terminal layout according to a ninth embodiment of the present invention;

FIG. 21 is a list showing a VGA (VESA DOC) terminal layout according to the $12^{th}$ embodiment of the present invention;

FIG. 22 is a list showing a VGA (VESA DDC) terminal layout according to a $13^{th}$ embodiment of the present invention;

FIG. 28 is a list showing a VGA (VESA DDC) terminal layout according to the 15th embodiment of the present invention

FIG. 35 is a list showing a VGA (VESA DDC) terminal layout in a computer according to the 20th embodiment of the present invention;

FIG. 39 is a list showing a VGA (VESA DOC) terminal layout according to the 23rd embodiment of the present invention;

FIG. 41 is a list showing a VGA (VESA DDC) terminal layout according to the 24th embodiment of the present invention.

DETAILED DESCRIPTION OF THE PREFERRED EMBODIMENTS

A description is given, with reference to the accompanying drawings, of embodiments of the present invention.

[First Embodiment]

Figure 1:
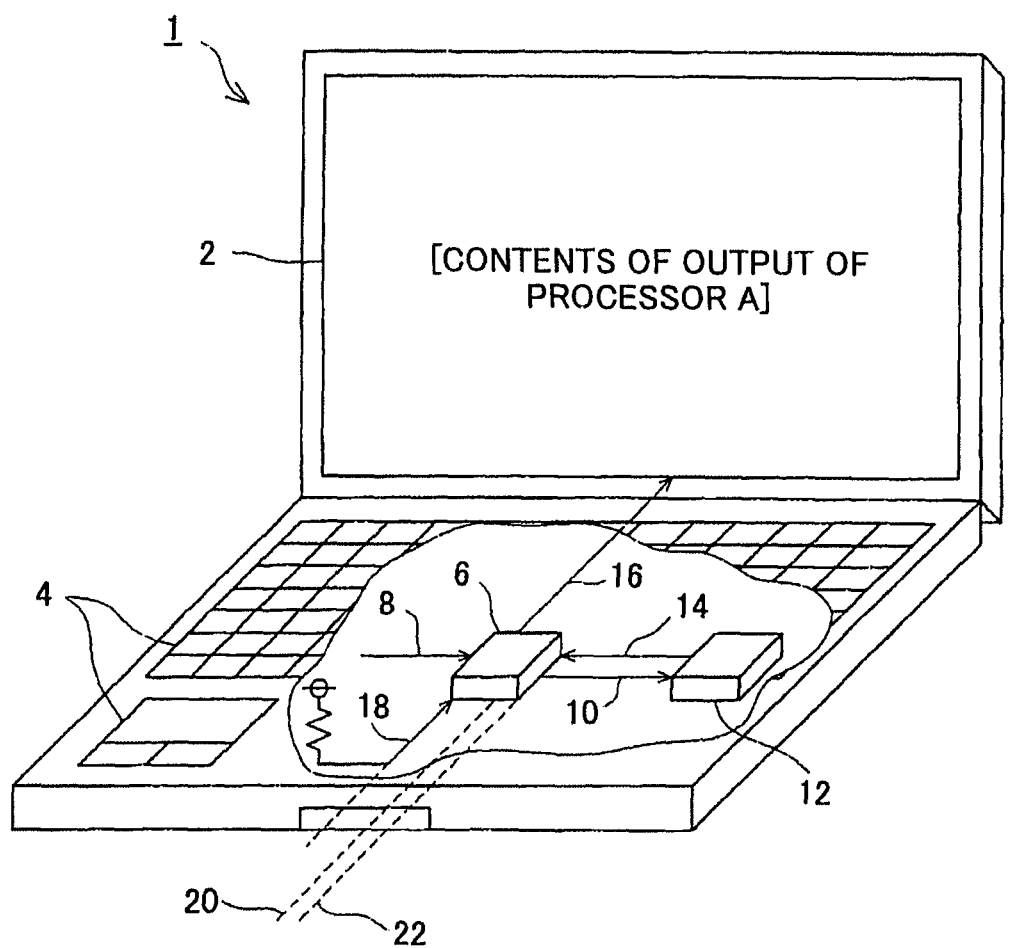
FIG. 1 is a perspective view (partially exploded view) of a computer integrated with an input/output device according to a first embodiment of the present invention.
Figure 2:
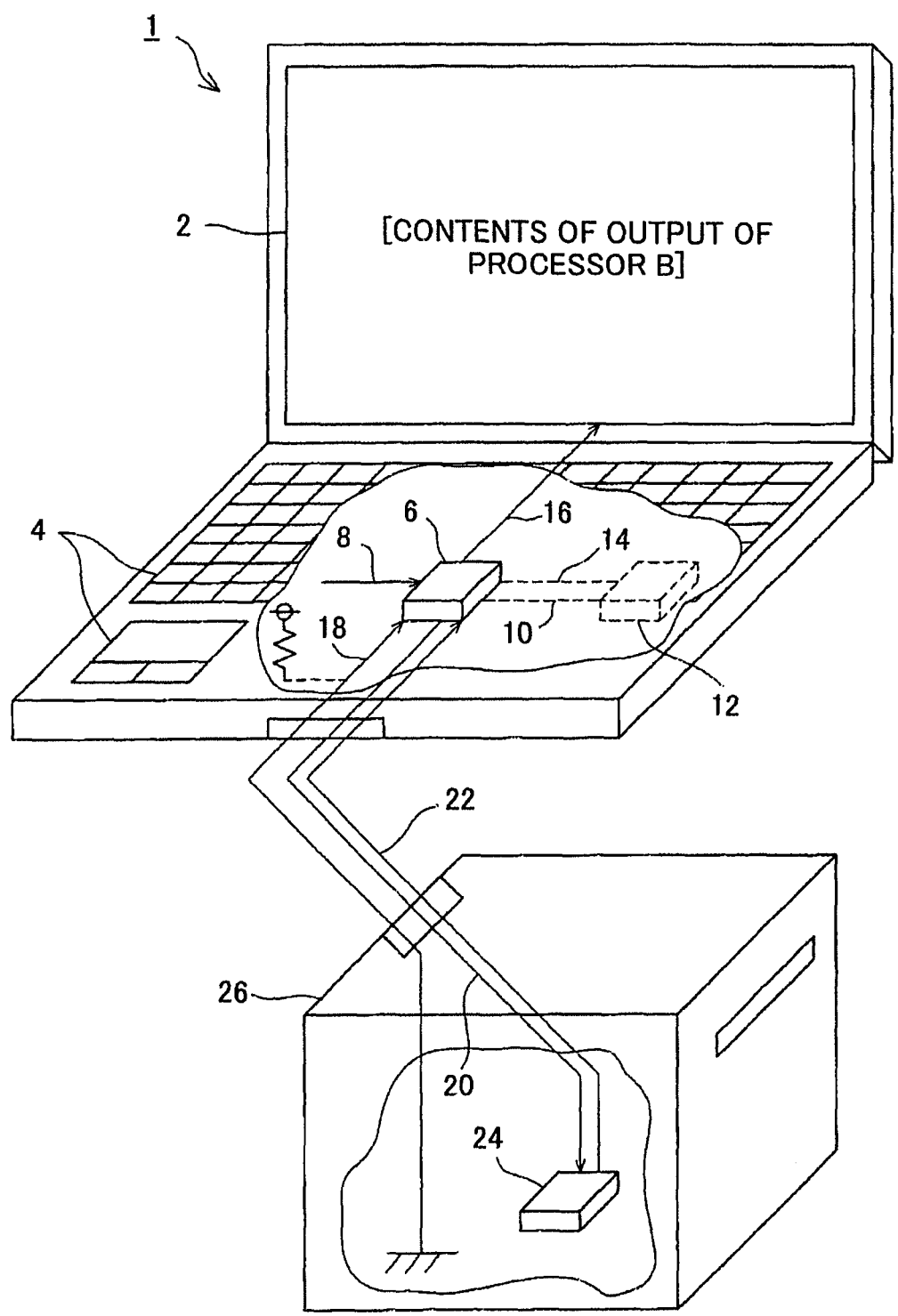
FIG. 2 is another perspective view (partially exploded view) of the computer integrated with the input/output device according to the first embodiment of the present invention.

FIGS. 1 and 2 are perspective views (partially exploded views) of a computer 1 integrated with an input/output device according to a first embodiment of the present invention. Mainly, a notebook computer is assumed as the computer 1 according to the first embodiment. However, the computer 1 may be a desktop computer of a space-saving type, which is a desktop computer integrated with an input/output device.

The computer 1 includes a switching unit 6 that can output the contents of the output of another computer 26 (FIG. 2) to an output device 2 of the computer 1. Further, the switching unit 6 can also input the contents of input to an input device 4 of the computer 1 to the computer 26.

When the computer 1 is not connected to the computer 26 as shown in FIG. 1, a switch signal 18 to the switching unit 6 is "H (high)." At this point, the switching unit 6 provides an input signal 8 from the input device 4 to a processor A 12 in the computer 1 as an input signal A 10. Receiving the input signal A 10, the processor A 12 outputs an output signal A 14 to the switching unit 6. Receiving the output signal A 14, the switching unit 6 provides the output signal A 14 to the output device 2 as an output signal 16.

In the case of connecting the computer 26 to the computer 1, the computer 26 and the connection between the computer 1 and the computer 26 are configured so that the switch signal 18 to the switching unit 6 is "L (low)" as shown in FIG. 2. At this point, the switching unit 6 provides the input signal 8 from the input device 4 to a processor B 24 in the computer 26 as an input signal B 20. Receiving the input signal B 20, the processor B 24 outputs an output signal B 22 to the switching unit 6. Receiving the output signal B 22, the switching unit 6 provides the output signal B 22 to the output device 2 as the output signal 16.

For example, it is assumed that a notebook personal computer (computer 1) is used at an outside location and a desktop personal computer (computer 26) is used back at a base location (for example, home, office, etc.). In this case, the desktop personal computer needs a monitor as an output device and a keyboard and a mouse as input devices. However, by connecting the computer 26 (desktop personal computer) to the computer 1 (notebook personal computer), it is possible to display the output signal of the computer 26 (desktop personal computer) on the output device 2 (for example, a monitor) of the computer 1 (notebook personal computer), and it is possible to make input to the computer 26 (desktop personal computer) using the input device 4 (for example, a keyboard and/or a touch pad) of the computer 1 (notebook personal computer). That is, the computer 26 (desktop personal computer) can dispense with a monitor, a keyboard, and a mouse, so that it is possible to reduce cost and save space.

[Second Embodiment]

Figure 3:
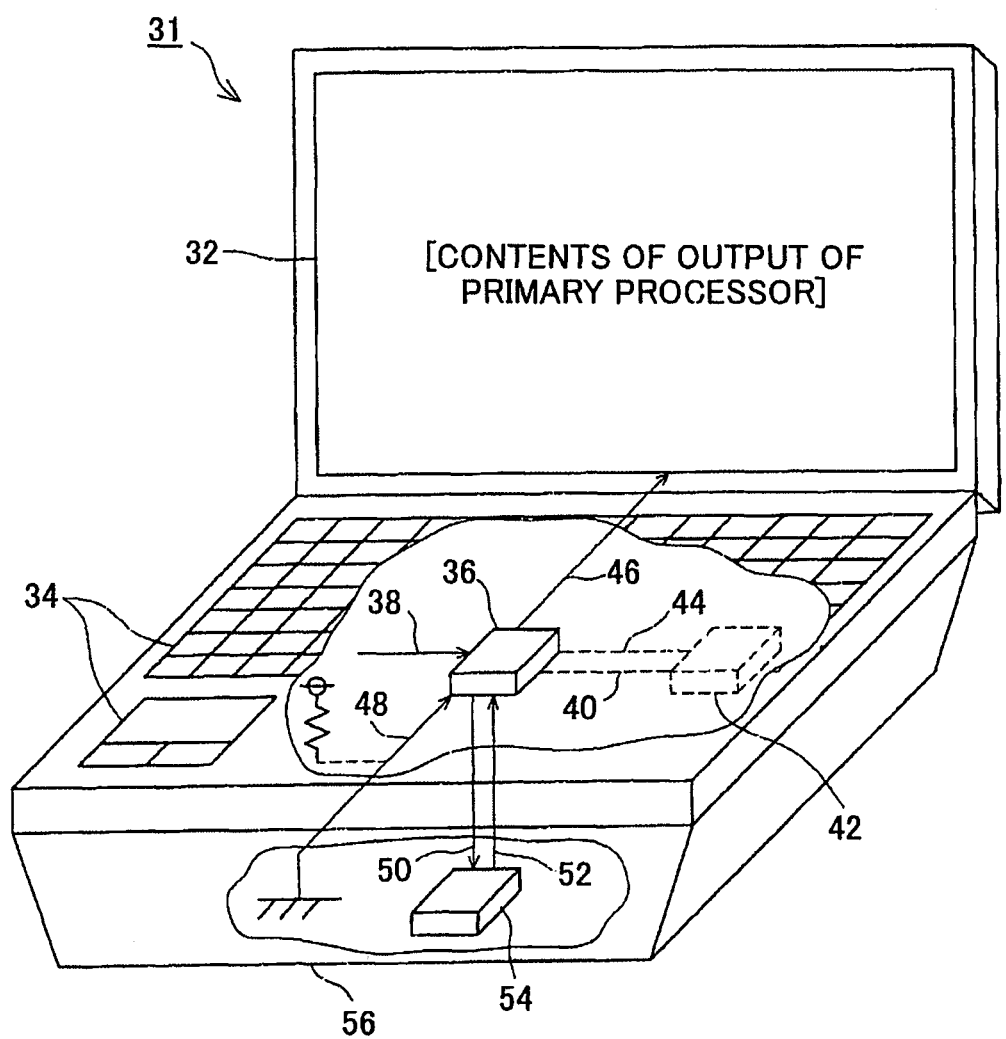
FIG. 3 is a perspective view (partially exploded view) of a computer including a removable input/output device and a computer main body according to second and third embodiments of the present invention.

FIGS. 3 and 4 are perspective views (partially exploded views) of a computer including a removable input/output device 31 and a computer main body 56 according to a second embodiment of the present invention. As shown in FIGS. 3 and 4, the computer according to this embodiment may be a notebook computer having a removable input/output device (for example, a flat panel monitor, a keyboard, and a touch pad/track ball). The input/output device 31 does not have secondary storage, and includes a secondary processor A 42 of low power consumption. However, the secondary processor 42 includes a CPU and a memory part so as to be able to perform the minimum required processing.

The removable input/output device 31 according to the second embodiment includes a switching unit 36 that can output the contents of the output of the computer main body 56 to an output device (display and output device) 32 of the input/output device 31. Further, the switching unit 36 can also input the contents of input to an input device 34 of the input/output device 31 to the computer main body 56.

In the case of attaching the removable input/output device 31 to the computer main body 56, the computer main body 56 and the connection between the removable input/output device 31 and the computer main body 56 are configured so that a switch signal 48 to the switching unit 36 is "L (low)" as shown in FIG. 3. At this point, the switching unit 36 provides an input signal 38 from the input device 34 to a primary processor B 54 in the computer main body 56 as an input signal B 50. Receiving the input signal B 50, the primary processor B 54 outputs an output signal B 52 to the switching unit 36. Receiving the output signal B 52, the switching unit 36 provides the output signal B 52 to the output device 32 as an output signal 46.

When the input/output device 31 is not connected to the computer main body 56 as shown in FIG. 4, the switch signal 48 sent to the switching unit 36 is "H (high)." At this point, the switching unit 36 provides the input signal 38 from the input device 34 to the secondary processor A 42 in the removable input/output device 31 as an input signal A 40. Receiving the input signal A 40, the secondary processor A 42 outputs an output signal A 44 to the switching unit 36. Receiving the output signal A 44, the switching unit 36 provides the output signal A 44 to the output device 32 as the output signal 46.

It is assumed that normally, the removable input/output device 31 and the computer main body 56 according to the second embodiment are integrated and used as a unit. However, the removable input/output device 31 and the computer main body 56 may also be used independent of each other. Since the removable input/output device 31 includes the secondary processor A 42, the removable input/output device 31 can also operate as a simple computer (such as a FDA) when separated or detached from the computer main body 56.

Figure 5:
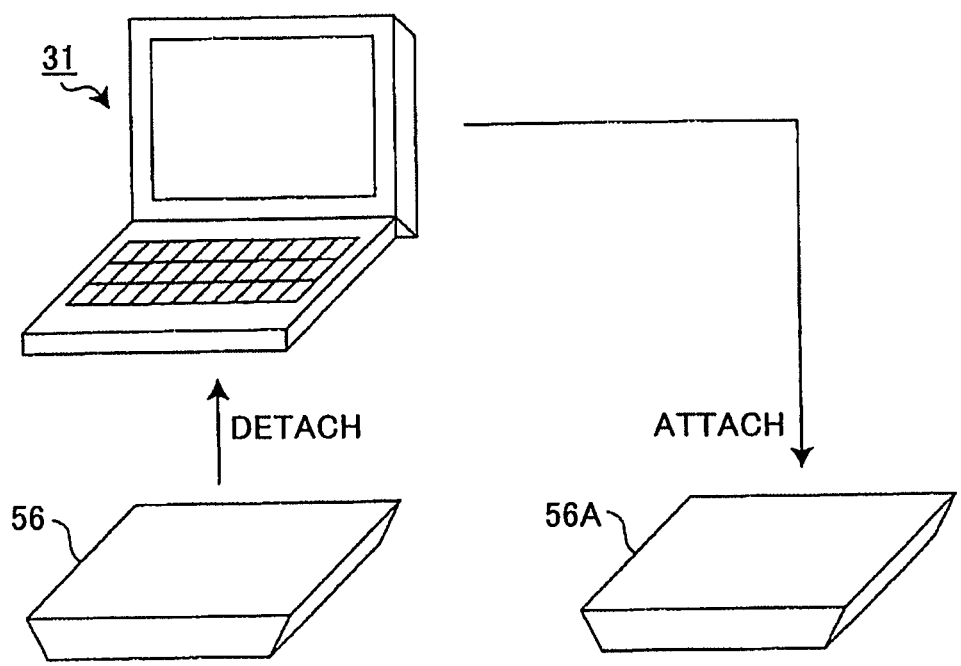
FIG. 5 is an example use of the second embodiment of the present invention.

Further, as shown in FIG. 5, the removable input/output device 31 detached from the computer main body 56 is attached to another computer (computer main body 56A) to serve as the input/output device of the other computer. The computer main body 56 according to this embodiment has a so-called "docking station" shape, and the computer main body 56 and the removable input/output device 31 are connected with the connector of the docking station. The switching unit 36 of the removable input/output device 31 recognizes connection of the connector, and performs switching between the input/output signal of the primary processor B 54 of the computer main body 56 and the input/output signal of the secondary processor A 42 of the removable input/output device 31.

In the second embodiment, since the input/output device 31 is detachable, the input/output device 31 is also usable in another computer (personal computer) according to this embodiment as shown in FIG. 5. For example, even if the output device 32 such as a monitor is broken, it is only necessary to replace the removable input/output device 31. Therefore, it is possible to save time and effort for moving data and reinstalling software in the computer main body 56. Accordingly, it is possible to reduce time for which the computer is unusable.

Further, the detachable input/output device 31 with the secondary processor A 42 is reduced in weight and size compared with the case where the detachable input/output device 31 is integrated with the computer main body 56. The secondary processor A 42 can be lower in power consumption than the primary processor B 54, so that the detachable input/output device 31 is reduced in power consumption compared with the case where the detachable input/output device 31 is integrated with the computer main body 56. Even if only the removable input/output device 31 is dropped and broken while being carried, this breakage has nothing to do with the computer main body 56. As a result, it is possible to protect data inside a hard disk. Further, since it is possible to fix the computer main body 56 to furniture with a hook or chain, adequate measures can be taken against theft. Since the removable input/output device 31 retains hardly any data, there is little possibility of information outflow (disclosure) even if the removable input/output device 31 is stolen.

[Third Embodiment]

FIGS. 3 and 4 are also perspective views (partially exploded views) of a computer including the removable input/output device 31 and the computer main body 56 according to a third embodiment of the present invention. As set forth below, the third embodiment relates in particular to the switching operation of the switching unit 36 in the removable input/output device 31.

As shown in FIGS. 3 and 4, the computer main body 56 including the primary processor B 54 is in the form of a so-called docking station, and the removable input/output device 31 is in the form of a notebook personal computer. The computer main body 56 and the removable input/output device 31 may be connected with, for example, a cable with connection connectors.

The switching unit 36 provided in the removable input/output device 31 includes an input switching part 36a and an output switching part 36b, and performs switching between the input/output signal to/from the primary processor B 54 and the input/output signal to/from the secondary processor A 42. (See FIG. 6.) First, when the removable input/output device 31 is attached to the computer main body 56, the switch signal 48 is "L" so as to enable the input signal B 50 to and the output signal B 52 from the primary processor B 54. Here, the input signal A 40 contains information on the switch signal 48, which is input to an interrupt operation unit 82 (FIG. 6) of the secondary processor A 42 so as to control stoppage and returning to operation of the secondary processor A 42.

Next, when the removable input/output device 31 is detached from the computer main body 56, the switch signal 48 is "H" so as to enable the input signal A 40 to and the output signal A 44 from the secondary processor A 42. Here, the input signal B 50 contains information on the switch signal 48, which is input to an interrupt operation unit 102 (FIG. 6) of the primary processor B 54 so as to control stoppage and returning to operation of the primary processor B 54.

Figure 6:
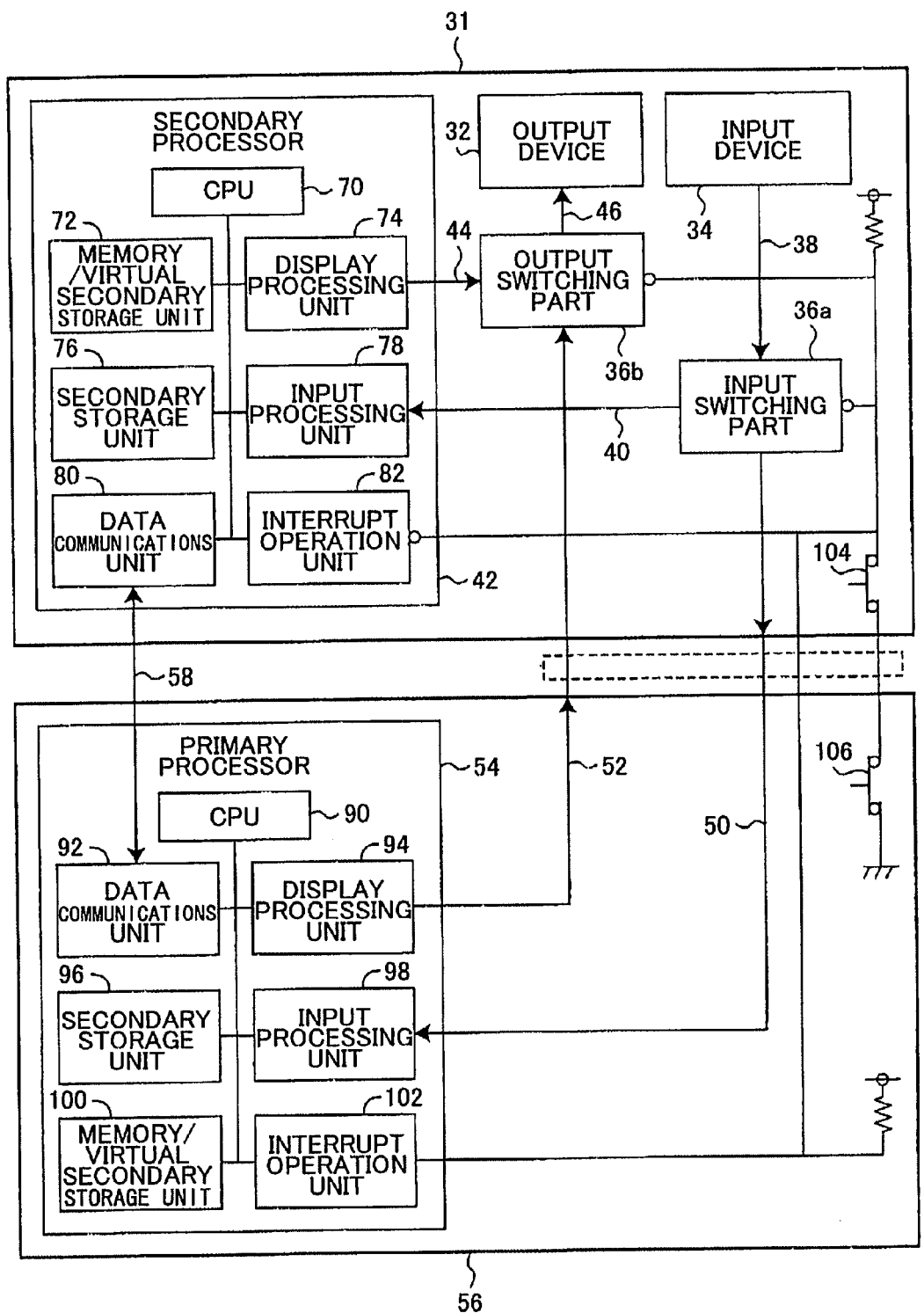
FIG. 6 is a block diagram showing any of the computers according to the second and third embodiments of the present invention and a computer including the removable input/ output device and the computer main body according to a fourth embodiment of the present invention.

As shown in FIG. 6, when the removable input/output device 31 is detached, the input to the interrupt operation unit 82 of the secondary processor A 42 becomes "H," and the returning operation of the secondary processor A 42 is started. The details of this returning operation are described in the flowchart of (a) of FIG. 7. That is, when the removable input/output device 31 is detached in step S02, in step S04, it is determined whether the removable input/output device 31 is stopped. Then, if necessary, a returning operation is performed in step S08. Thereafter, in step S10, the input/output is switched to the secondary processor A 42.

On the other hand, when the removable input/output device 31 is attached, the input to the interrupt operation unit 82 of the secondary processor a 42 becomes "L," and the operation of the secondary processor A 42 is stopped. (See FIG. 6.) The details of this stopping operation are described in the flowchart of (a) of FIG. 8. That is, after attachment of the removable input/output device 31 in step S62, in step S64, the input/output is switched to the primary processor B 54.

Meanwhile, as shown in FIG. 6, when the removable input/output device 31 is detached, the input to the interrupt operation unit 102 of the primary processor B 54 becomes "H," and the operation of the primary processor B 54 is stopped. The details of this stopping operation are described in the flowchart of (b) of FIG. 7. That is, after the removable input/output device 31 is detached in step S32, in step S34, it is determined whether to perform an automatic stopping operation. If it is determined that the automatic stopping operation is to be performed (YES in step S34), in step S36, a stopping operation is performed.

Further, when the removable input/output device 31 is attached, the input to the interrupt operation unit 102 of the primary processor B 54 becomes "L," and the returning operation of the primary processor B 54 is started. (See FIG. 6.) The details of this returning operation are described in the flowchart of (b) of FIG. 8. That is, after the removable input/output device 31 is attached in step S80, in step S82, it is determined whether the computer main body 56 is stopped. If it is determined in step S82 that the computer main body 56 is stopped, in step S84, its returning operation is performed.

As described above, since the secondary processor A 42 is provided in the removable input/output device 31, the removable input/output device 31 can operate as an independent computer by switching the input/output to the secondary processor A 42 in the case of detaching the removable input/output device 31. At this point, the primary processor B 54 (of the computer main body 56) can also operate as a computer independent of the removable input/output device 31.

Further, it is possible to cause transition of the computer main body 56 and the removable input/output device 31 to a virtually detached state by opening a detachment switch 106 of the computer main body 56 or a detachment switch 104 of the removable input/output device 31.

Referring to FIG. 6, the secondary processor A 42 includes a CPU 70, a memory/virtual secondary storage unit 72, a display processing unit 74, the secondary storage unit 76, an input processing unit 78, the data communications unit 80, and the interrupt processing unit 82. The input signal A 40 is input from the input switching part 36a to the input processing unit 78. The output signal A 44 is output from the display processing unit 74 to the output switching part 36b. The primary processor B 54 includes a CPU 90, the data communications unit 92, a display processing unit 94, the secondary storage unit 96, an input processing unit 98, a memory/virtual secondary storage unit 100, and the interrupt processing unit 102. The output signal B 52 is output from the display processing unit 94 to the output switching part 36b. The input signal B 50 is input from the input switching part 36a to the input processing unit 98.

[Fourth Embodiment]

Figure 9:
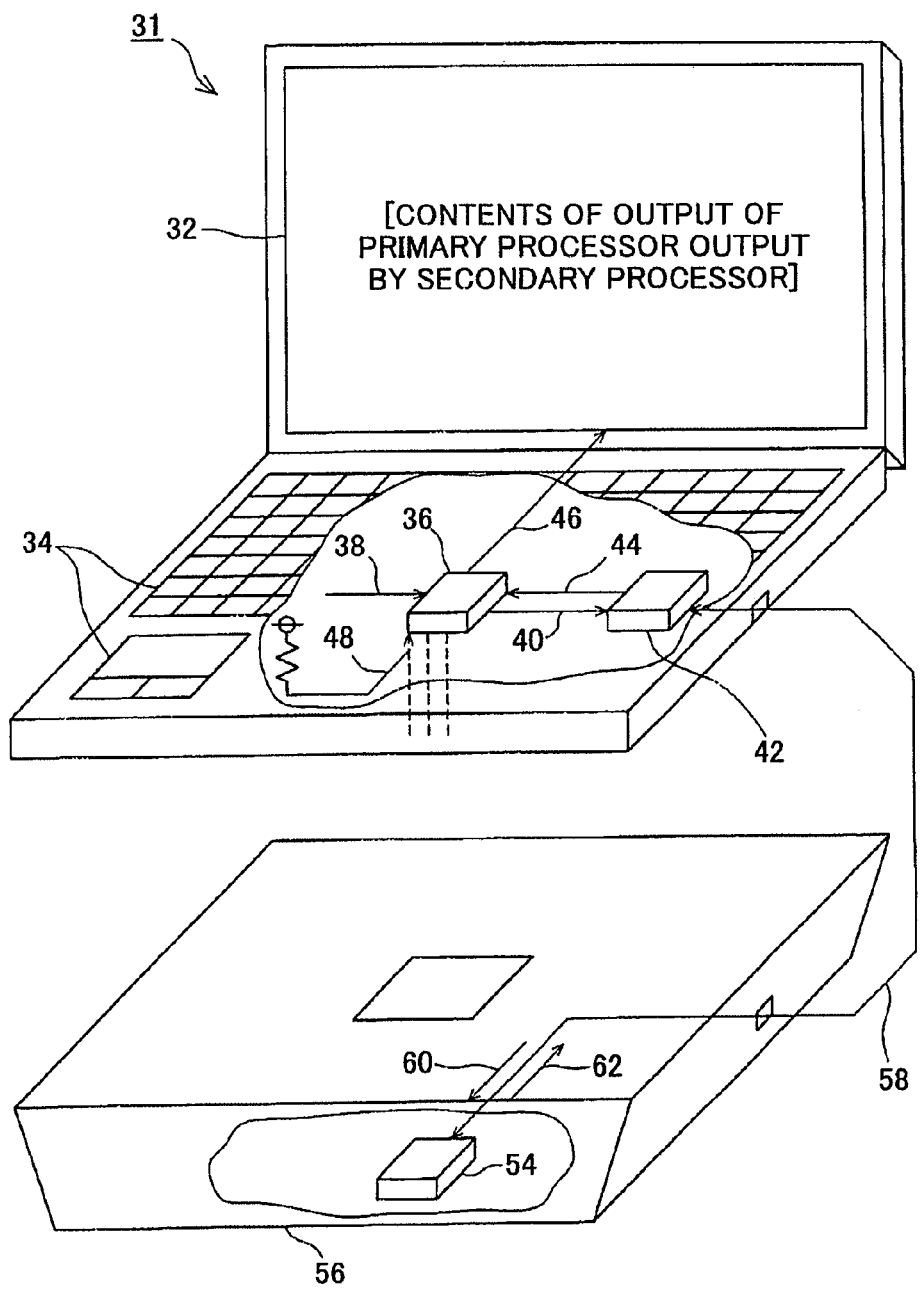
FIG. 9 is a perspective view (partially exploded view) of the computer according to the fourth embodiment of the present invention.

FIG. 9 is a perspective view (partially exploded view) of a computer including the removable input/output device 31 and the computer main body 56 according to a fourth embodiment of the present invention. The fourth embodiment is substantially the same as the second and third embodiments, but is different therefrom in that the removable input/output device 31 and the computer main body 56 are remotely connected. At least two ways are assumable to switch between the input/outputs of the primary processor B 54 and the secondary processor A 42 by remote connection. A description is given below, focusing mainly on the difference therebetween.

(a) Connection Via a Network

A remote network service function via a network, such as the "remote desktop connection" of "Windows XP Professional (Microsoft)" is enabled in the computer main body 56. The primary processor B 54 processes the service, and the secondary processor A 42 performs remote connection. The output information of the primary processor B 54 is transmitted to the secondary processor A 42 via a data transmission line 58, and the secondary processor A 42 displays the information on the output device 32. The secondary processor A 42 transmits information from the input device 34 to the primary processor B 54 via the data transmission line 58, and the primary processor B 54 processes the information as input from the input device 34. This makes it possible for the removable input/output device 31 in a detached state to virtually operate as the input/output device of the computer main body 56.

When the removable input/output device 31 is detached and there is no remote connection therefrom, the computer main body 56 may enter a low power consumption mode such as suspend/hibernation/shutdown and be prevented from operating. In such a case, enabling a remote start command receiving function such as Wake On LAN (WOL) in the computer main body 56 makes it possible to cause the computer main body 56 to return from the low power consumption mode by transmitting a remote start command such as Magic Packet™ at the time of performing remote connection from the secondary processor A 42 of the removable input/output device 31. Further, transmission of a message from the primary processor B 54 of the returned computer main body 56 to the secondary processor A 42 via the data transmission line 58 makes it possible to remotely connect the secondary processor A 42 immediately after the return of the primary processor B 54.

In the case of detaching the secondary processor A 42 from the computer main body 56 and remotely connecting the detached secondary processor A 42 in the above-described form of connection according to the fourth embodiment, causing an auxiliary device of the secondary processor A 42 to be recognized as, for example, a network directory or shared folder by the computer main body 56 makes it possible to view the auxiliary device of the secondary processor A 42 from the computer main body 56 on its basic software. As a result, a document created while the detached removable input/output device 31 is operating as a PDA can be edited from the computer main body 56 at the time of remote connection.

Further, in the case of detaching the secondary processor A 42 from the computer main body 56 and remotely connecting the detached secondary processor A 42, causing an auxiliary device of the primary processor B 54 to be recognized as, for example, a network directory or shared folder by the secondary processor A 42 makes it possible to view the auxiliary device of the primary processor B 54 from the secondary processor A 42 on its basic software. As a result, a document created in advance in the detached computer main body 56 can be edited from the removable input/output device 31 at the time of remote connection.

Further, in the case of physically attaching the secondary processor A 42 to the computer main body 56, causing an auxiliary device of the secondary processor A 42 to be recognized as, for example, a USB memory by the computer main body 56, the auxiliary device of the secondary processor A 42 can be viewed from the computer main body 56 on its basic software. As a result, a document created while the detached removable input/output device 31 is operating as a PDA can be edited from the computer main body 56 when the removable input/output device 31 is attached to the computer main body 56.

(b) Connection Using a Radio Peripheral Device

With the computer main body 56 recognizing the removable input/output device 31 as being directly connected thereto physically, the computer main body 56 and the detached removable input/output device 31 are connected by radio connection such as infrared, Bluetooth or an IEEE 802.11 ad hoc connection. As a result, the removable input/output device 31 can operate as a directly connected device.

Connecting the removable input/output device 31 and the computer main body 56 as described above makes it possible to connect the computer main body 56 to an AC power supply. Accordingly, the computer main body 56 can operate with its maximum processing power. Accordingly, unlike in the case of battery connection, there is no need to consider operable time or power consumption. The secondary processor A 42 of the removable input/output device 31 performs regular processing (that is, processing of the output information of the primary processor B 54 and transmission of input information to the primary processor B 54) irrespective of the operating state of the primary processor B 54. Accordingly, its power consumption is substantially constant. Therefore, it can be expected of the removable input/output device 31 to operate for a pre-assumed operable time irrespective of the status of processing of the computer main body 56.

(c) Processing Under the Above-Described Connection (a) or (b)

In order to realize the above-described connection (a) or (b) in the fourth embodiment of the present invention, at least it is necessary for the computer main body 56 and the removable input/output device 31 to operate as independent computers. Further, the secondary processor A 42 and the primary processor B 54 are provided with data communications units 80 and 92 (FIG. 6), respectively, for data communications.

Further, as shown in FIG. 9, with a remote connection from the secondary processor A 42 to the primary processor B 54 being established, the primary processor B 54 transmits output information to the secondary processor A 42, and the secondary processor A 42 transmits input information to the primary processor B 54. Thereby, the output information of the primary processor B 54 is output to the output device 32, and the input information from the secondary processor A 42 is input to the primary processor B 54.

Figure 7:
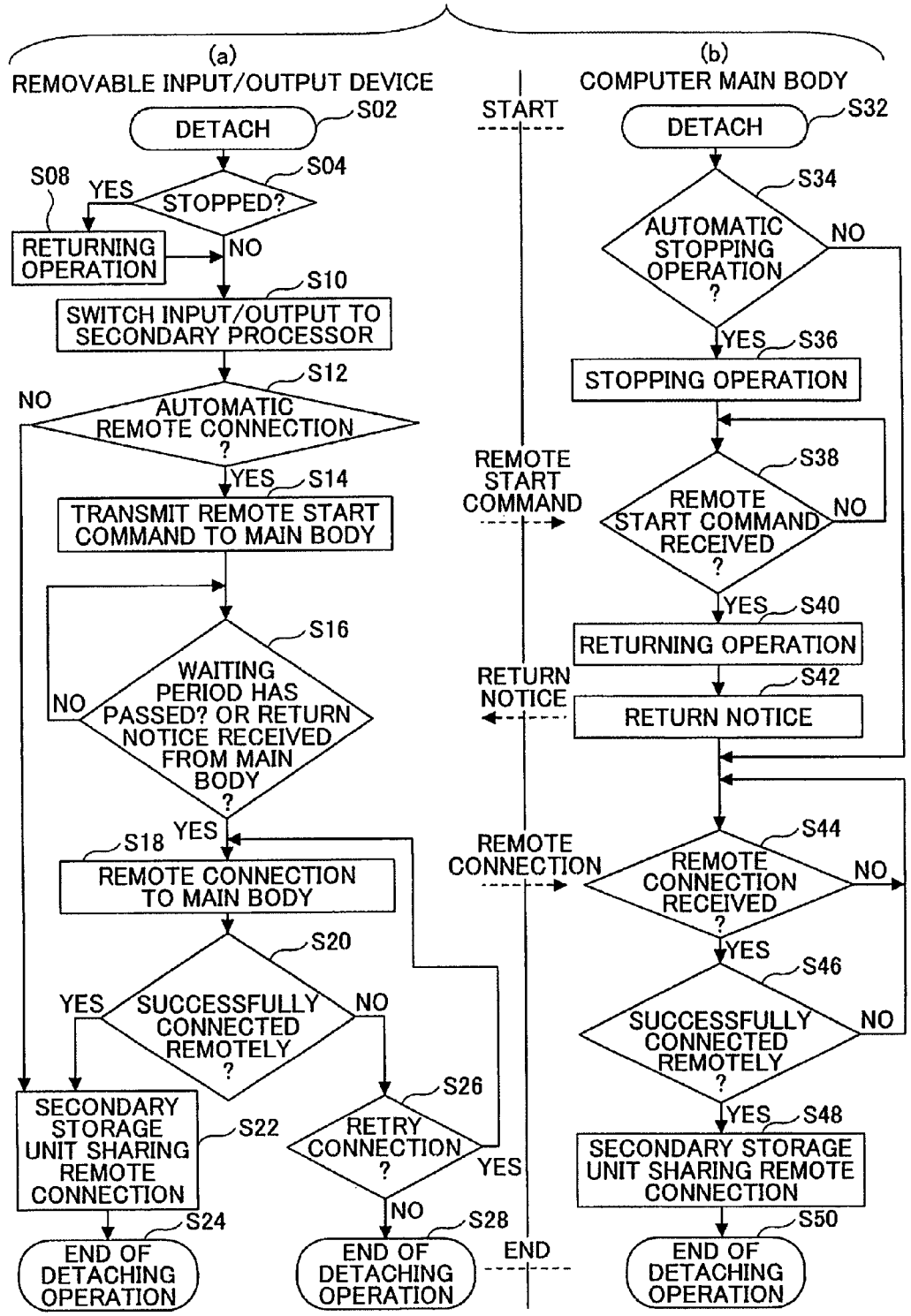
FIG. 7 is a flowchart of an operation of any of the computers according to the second through fourth embodiments of the present invention.
Figure 8:
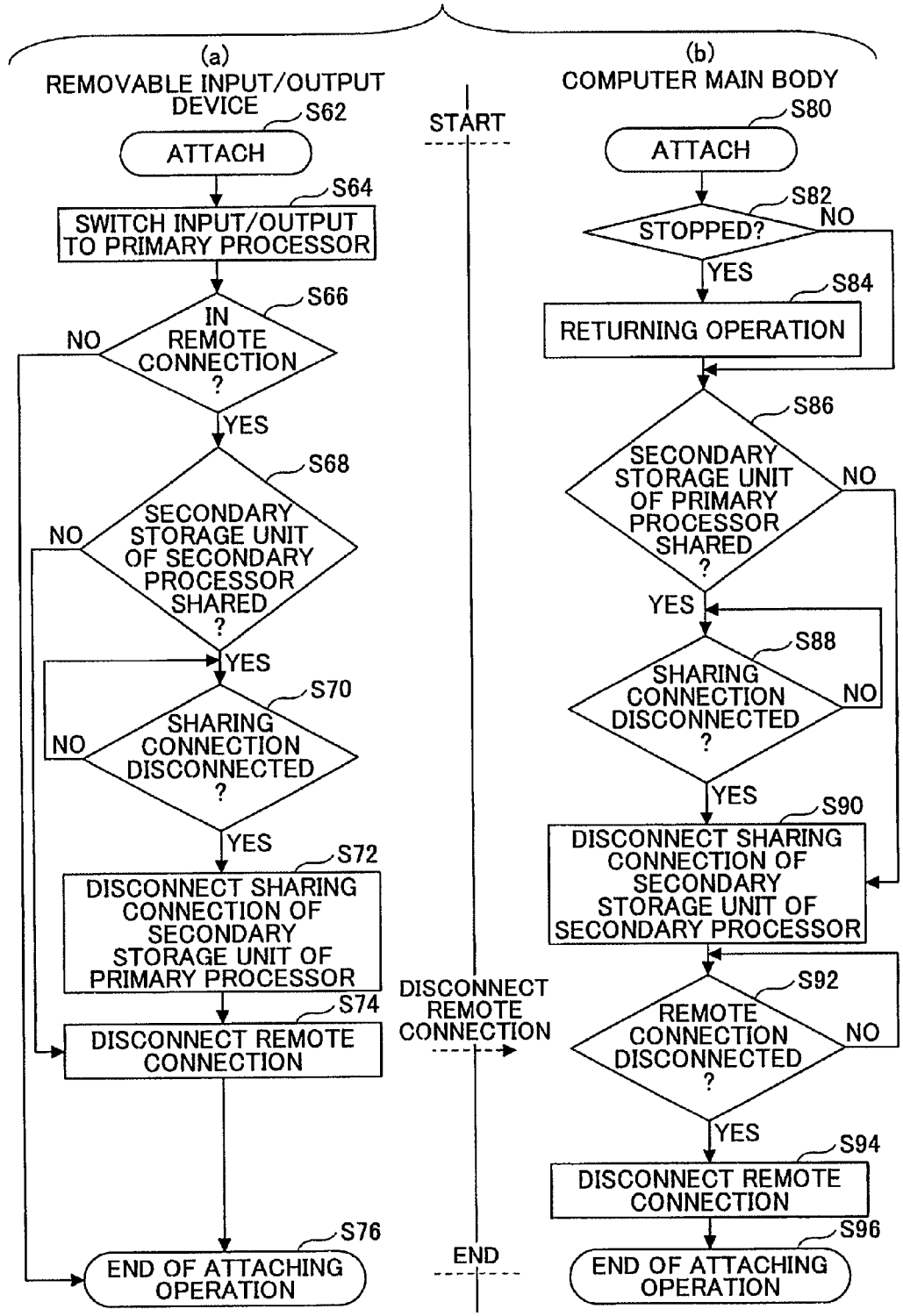
FIG. 8 is another flowchart of the operation of any of the computers according to the second through fourth embodiments of the present invention.

Next, an overview is given, with reference to FIGS. 7 and 8, of the operations of the removable input/output device 31 and the computer main body 56 at the time when the removable input/output device 31 and the computer main body 56 are detached (and remotely connected) and at the time when the removable input/output device 31 and the computer main body 56 are attached. At the time of remote connection, the secondary processor A 42 transmits a remote start command to the primary processor B 54 via the data transmission line 58 (step S14 of (a) of FIG. 7 and step S38 of (b) of FIG. 7), and the primary processor B 54 returns from a state such as a suspended state (step S40 of (b) of FIG. 7). When the primary processor B 54 returns in response to the remote start command, the primary processor B 54 notifies the secondary processor A 42 of its return (step S42 of (b) of FIG. 7 and step S16 of (a) of FIG. 7).

Further, when the removable input/output device 31 is detached and remotely connected, the input to the interrupt operation unit 82 of the secondary processor A 42 becomes "H" (FIG. 6), so that a remote connecting operation is started (steps S12, S14, S16, S18, S20, S22, S24, S26, and S28 of (a) of FIG. 7). That is, in step S12, it is determined whether to perform automatic remote connection. If YES in step S12, in step S14, the secondary processor A 42 transmits a remote start command to the primary processor B 54 via the data transmission line 58 as described above. Then in step S16, it is determined whether a waiting period has passed or whether a return notice (indicating the return to operation of the computer main body 56) is received from the computer main body 56. If the waiting period has passed or a return notice is received (YES in step S16), in step S18, the removable input/output device 31 is remotely connected to the computer main body 56. Then, in step S20, it is determined whether the removable input/output device 31 has been successfully connected remotely to the computer main body 56. If YES in step S20, in, step S22, a secondary storage unit sharing remote connecting operation (described below) is performed. Then, in step S24, the detaching operation ends. If NO in step S20, in step S26, it is determined whether to retry connection. If NO in step S26, in step S28, the detaching operation ends.

When the removable input/output device 31 is attached, the input to the interrupt operation unit 82 of the secondary processor A 42 becomes "L" (FIG. 6), and a remote connection disconnecting operation is started (steps S66, S68, S70, S72, S74, and S76 of (a) of FIG. 8). That is, in step S66, it is determined whether the removable input/output device 31 is being remotely connected to the computer main body 56. If YES in step S66, in step S68, it is determined whether a secondary storage unit 76 (FIG. 6) of the secondary processor A 42 is shared. If YES in step S68, in step S70, it is determined whether the sharing connection of the secondary storage unit 76 is disconnected. If YES in step S70, then in step S72, the sharing connection of a secondary storage unit 96 (FIG. 6) of the primary processor B 54 is disconnected. Then, in step S74, the remote connection is disconnected, and in step S76, the attaching operation ends. The corresponding operation in the computer main body 56 is as shown in steps S86, S88, S90, S92, S94, and S96 of (b) of FIG. 8.

Further, when the removable input/output device 31 is attached, the input to the interrupt operation unit 102 of the primary processor B 54 becomes "L" (FIG. 6), and the operation of recognizing the secondary storage unit 76 of the secondary processor A 42 is started. When the removable input/output device 31 is detached and remotely connected (steps S44 and S46 of (b) of FIG. 7), the input to the interrupt operation unit 102 of the primary processor B 54 becomes "H" (FIG. 6), and the operation of recognizing the secondary storage unit 76 of the secondary processor A 42 is started (step S48 of (b) of FIG. 7).

When the removable input/output device 31 is detached and remotely connected (steps S18 and S20 of (a) of FIG. 7), the input to the interrupt operation unit 82 of the secondary processor A 42 becomes "H" (FIG. 6), and the operation of recognizing the secondary storage unit 96 of the primary processor B 54 is started (step S22 of (a) of FIG. 7).

[Fifth Embodiment]

Figure 10:
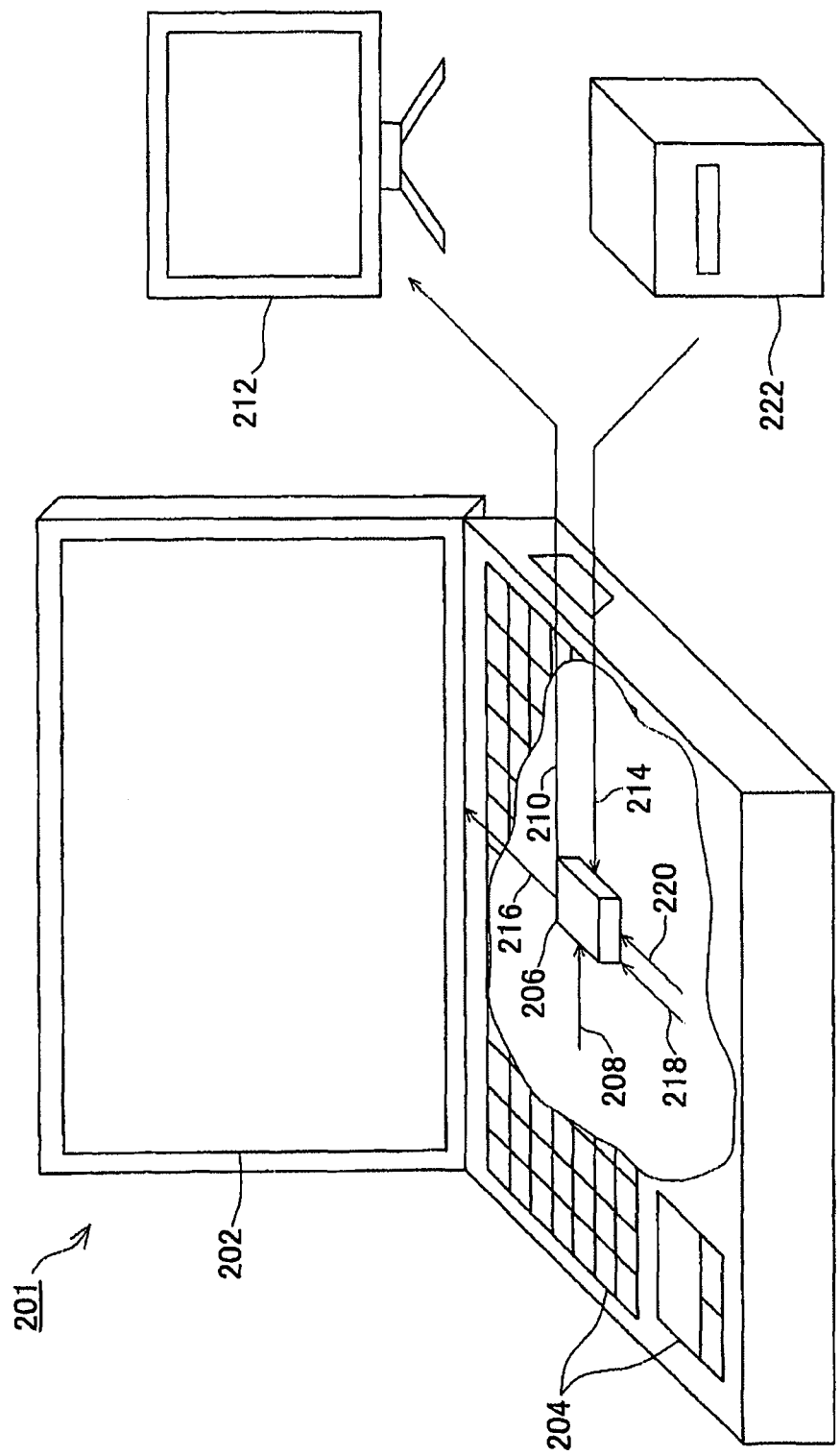
FIG. 10 is a perspective view (partially exploded view) of a computer according to a fifth embodiment of the present invention.
Figure 11:
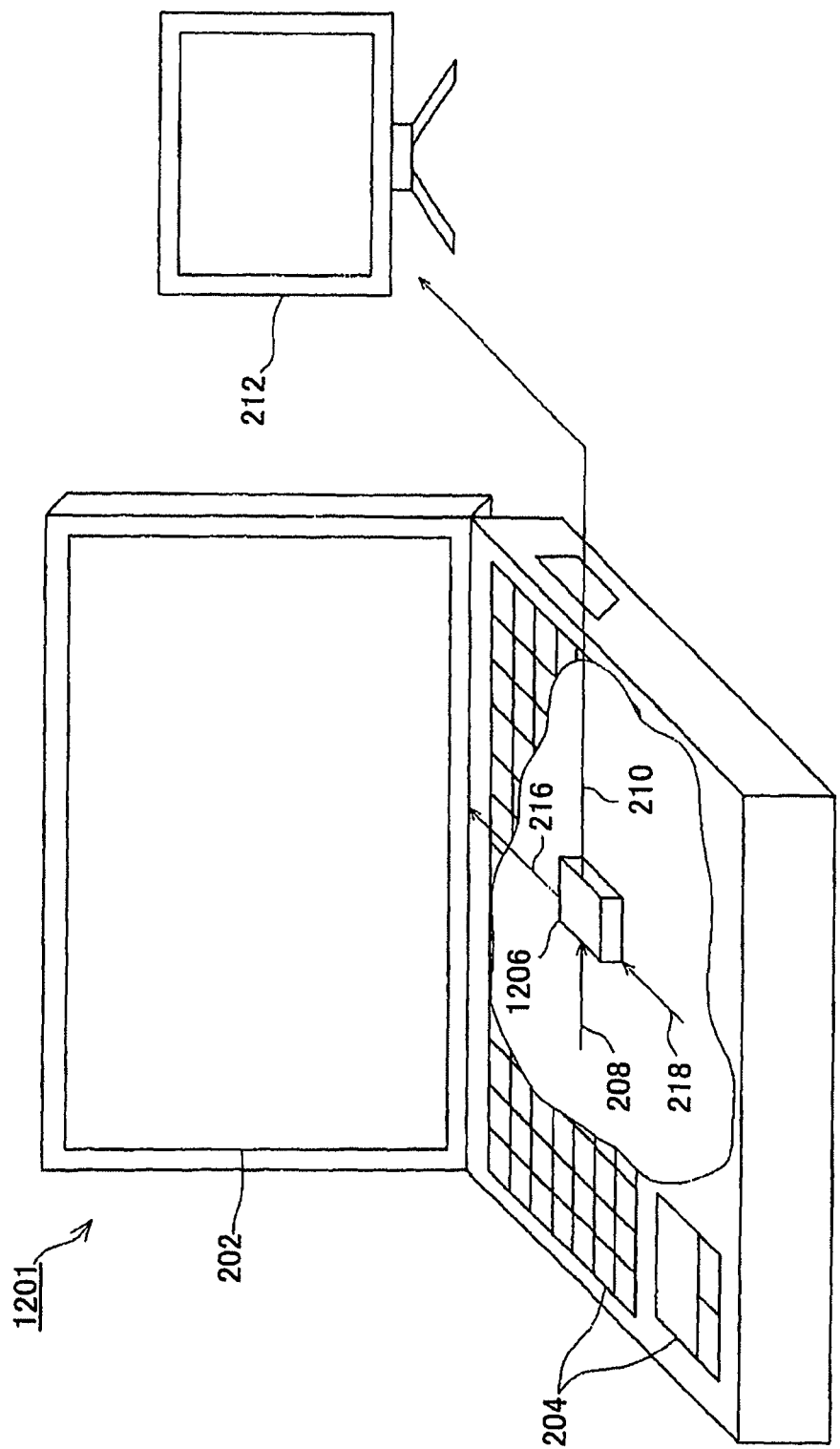
FIG. 11 is a perspective view (partially exploded view) of a conventional notebook computer to be compared with the computer of the fourth embodiment of the present invention.

FIG. 10 is a perspective view (partially exploded view) of a computer 201 according to a fifth embodiment of the present invention. The computer 201 may be a notebook computer. In the following embodiments, computers corresponding to the computer 201 are also referred to by the same reference numeral 201. FIG. 11 is a perspective view (partially exploded view) of a conventional notebook computer 1201 to be compared with the computer 201.

The conventional notebook computer 1201 (FIG. 11) has an image output switching unit 1206 provided therein. In response to a switch signal A 218, the image output switching unit 1206 selects-outputting an image input signal A 208 to an image output device 202 of the main body as an image output signal A 216 or outputting the image input signal A 208 to an external image output device 212 via an interface and a connector as an image output signal B 210.

On the other hand, in the computer 201 according to the fifth embodiment, an image input signal B 214 can be input to the interface of an image input/output switching unit 206, which interface connects to the external image output device 212. Further, input/output switching of the interface can be performed by a switch signal B 220.

In the case of displaying an image of the computer 201 on the external image output device 212, the interface of the image input/output switching unit 206, which interface connects to the external image output device 212, is switched to "output mode" by the switch signal B 220, and the image input signal A 208 is output to the external image output device 212 as the image output signal B 210 by operating the switch signal A 218.

In the case of displaying an image of an external computer 222 on the image output device 202 of the main body of the computer 201, the interface of the image input/output switching unit 206, which interface connects to the external computer 222, is switched to "input mode" by the switch signal B 220, and the image input signal B214 is output to the image output device 202 of the main body of the computer 201 as the image output signal A 216 by operating the switch signal A 218. When the interface is in "input mode," the image input signal B 214 may be automatically output to the image output device 202 of the main body of the computer 201 as the image output signal A 216 by the switch signal 220.

[Sixth Embodiment]

Figure 12:
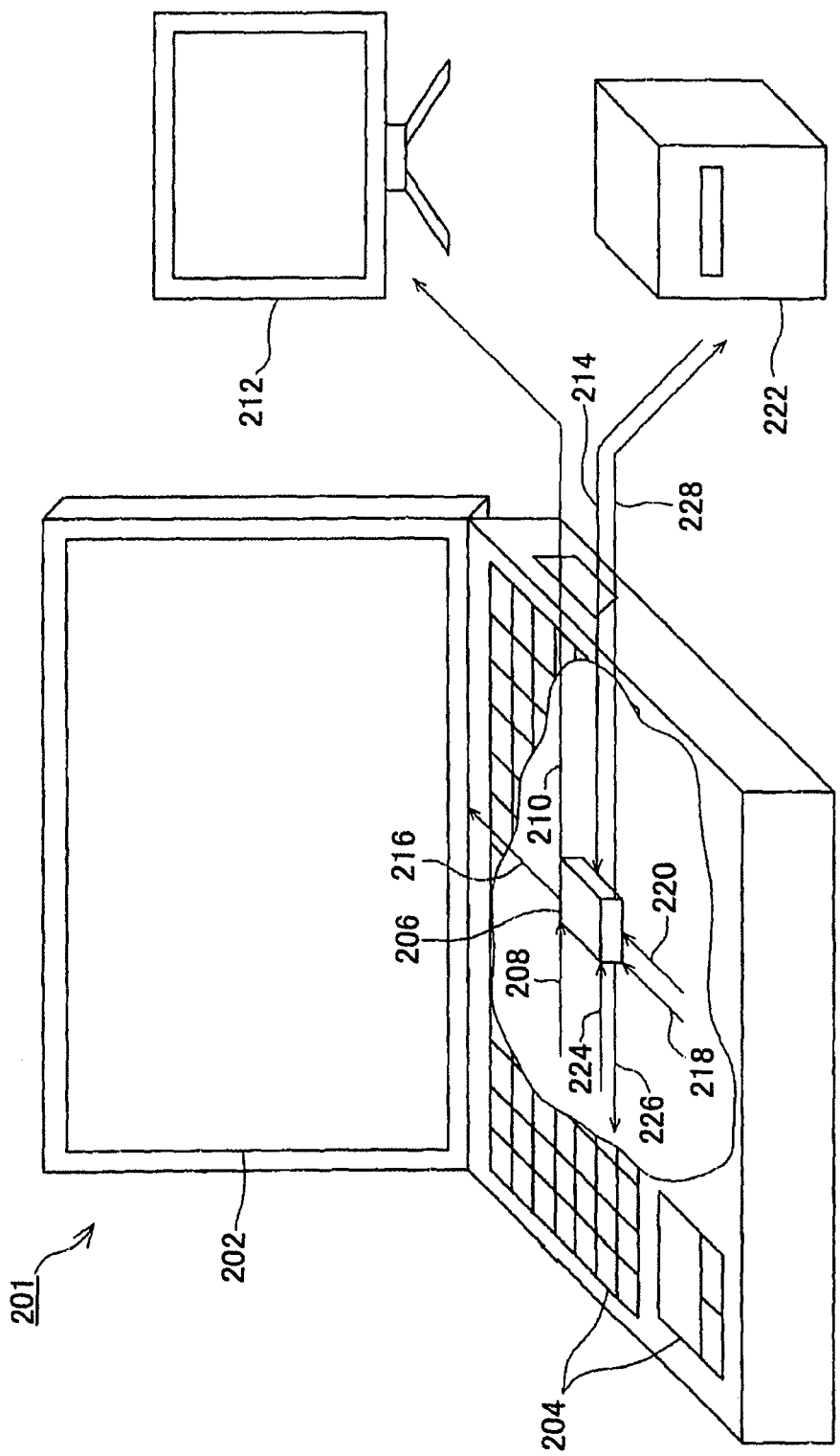
FIG. 12 is a perspective view (partially exploded view) of a computer according to a sixth embodiment of the present invention.

FIG. 12 is a perspective view (partially exploded view) of the computer 201 according to a sixth embodiment of the present invention. The computer 201 of this embodiment has the function of inputting the output of an input device 204 of the main body of the computer 201 to the external computer 222.

The computer 201 includes the image input/output switching unit (input device output switching and image input/output switching unit) 206 to which an input device input 224 of the main body is connected, and outputting an input device output A 226 to the main body or outputting an input device output B 228 to the external computer 222 can be selected by the switch signal B 220 in the image input/output switching unit 206.

In the case of operating the computer 201, the input device input 224 is output as the input device output A 226 to be input to the input device controller of the main body by operating the switch signal B 220. In the case of operating the external computer 222, the input device input 224 is output as the input device output B 228 to be input to the input device controller of the external computer 222 by operating the switch signal B 220.

[Seventh Embodiment]

A seventh embodiment of the present invention relates to an interface and a computer formed by assigning an input device input signal used in an external computer to a signal already assigned to an external image output interface in a computer such as a notebook personal computer. FIG. 13 is an assignment list of terminals and signals assigned to a VGA connector, which is a conventional interface, showing a conventional VGA (VESA DDC) terminal layout.

On the other hand, FIG. 14 is a list showing a VGA (VESA DDC) terminal layout according to the seventh embodiment, in which the input device signals of PS/2 DATA and PS/2 CLK are assigned to DDC-SDA of Terminal 12 and DDC-SCL of Terminal 15, respectively.

In this case, the input device input 224 of the computer 201 can be connected to the external computer 222. When the external image output device 212 is connected to the computer 201, it is possible to display an image itself from the computer 201 on the external image output device 212. However, since it is not possible to use SDA and SCL signals, data cannot be transmitted with a DDC interface.

[Eighth Embodiment]

An eighth embodiment of the present invention relates to an interface and a computer formed by assigning one of an input device input signal used in an external computer and a DDC interface by switching to a signal assigned as unused or reserved in an external image output interface in a computer such as a notebook personal computer. FIG. 15 is a list showing a VGA (VESA DDC) terminal layout according to the eighth embodiment.

Referring to FIG. 15, the input device signals of PS/2 DATA and PS/2 CLK are assigned to a reserved signal of Terminal 4 and an ID0 signal of Terminal 11, which is normally not used, respectively, and SDA and SCL of a DDC interface are assigned to the reserved signal of Terminal 4 and the ID0 signal of Terminal 11, respectively.

In this case, when the computer 201 is used as an image display unit of the external computer 222, first, Terminal 4 and Terminal 15 are assigned as DDC interfaces, so that the external computer 222 obtains information on the image display unit of the computer 201. Thereafter, Terminal 4 and Terminal 11 are assigned as PS/2 DATA and PS/2 CLK, respectively. As a result, the input device input of the computer 201 can be connected to the external computer 222.

In this case, the input device input of the computer 201 can be connected to the external computer 222, and data can be transmitted with a DDC interface. It is possible for the computer 201 to display an image on the external image output device 212 when the computer 201 is connected thereto. However, in the case of connecting the external computer 222 to the computer 201, it is necessary for the computer 201 to suitably switch the DDC interface and the PS/2 interface. Therefore, the structure of the image input/output switching unit 206 provided in the computer 201 is rather complicated.

[Ninth Embodiment]

A ninth embodiment of the present invention relates to an interface and a computer formed by assigning an input device input signal used in an external computer to a signal assigned as unused or reserved in an external image output interface in a computer such as a notebook personal computer. FIG. 16 is a list showing a VGA (VESA DDC) terminal layout according to the ninth embodiment.

Referring to FIG. 16, the input device signals of PS/2 DATA and PS/2 CLK are assigned to the reserved signal of Terminal 4 and the ID0 signal of Terminal 11, which is normally not used, respectively. In this case, it is possible to connect the input device input of the computer 201 to the external computer 222.

Further, in this case, the input device input of the computer 201 can be connected to the external computer 222, and data can be transmitted with a DDC interface. When the computer 201 and the external image output device 212 are connected, it is possible for the computer 201 to have an image displayed on the external image output device 212 while maintaining compatibility with the conventional terminal layout.

[Tenth Embodiment]

Figure 17:
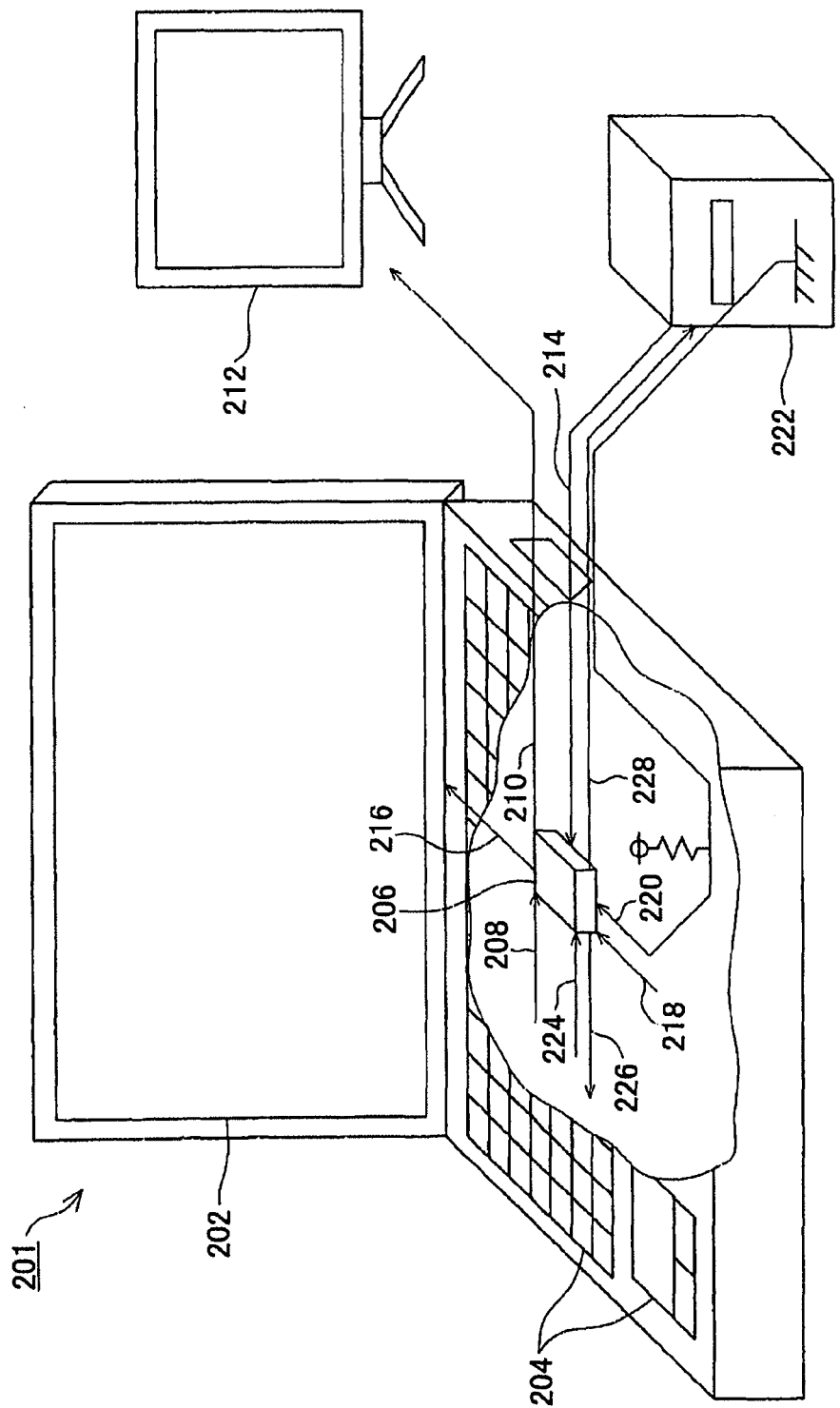
FIG. 17 is a perspective view (partially exploded view) of a computer according to a tenth embodiment of the present invention.

FIG. 17 is a perspective view (partially exploded view) of the computer 201 according to a tenth embodiment of the present invention. In the computer 201 according to the tenth embodiment, an input signal that detects connection of the external computer 222 is assigned to an external image output interface, and the signal is connected to the switch signal B 220 of the image input/output switching unit 206. Thereby, input and output of the image input/output switching unit 206 are automatically switched.

First, in the computer 201 according to the tenth embodiment, an input signal that detects connection of the external computer 222 is assigned to a terminal of the external image output interface. Further, as shown in FIG. 17, this input signal is connected to the switch signal B 220 of the image input/output switching unit 206, and has a pull-up resistor added thereto. Further, a corresponding terminal in the external computer 222 is grounded.

In the computer 201 according to the tenth embodiment, when the external computer 222 is connected to the external image output interface, the switch signal B 220 switches from "H" to "L." As a result, the input/output interface of the image input/output switching unit 206 automatically switches to "input mode."

Then, the image input signal B 214 of the external computer 222 is displayed on the image output device of the computer 201 via the image output signal A 216, while the input device input 224 is output as the input device output B 228.

Further, in the computer 201 according to the tenth embodiment, when the external computer 222 is not connected to the external image output interface, the switch signal B 220 switches from "L" to "H." As a result, the input/output interface of the image input/output switching unit 206 automatically switches to "output mode."

Then, the image input signal A 208 of the computer 201 is displayed on the external image output device 212 via the image output signal B 210, while the input device input 224 is output as the input device output A 226.

[11th Embodiment]

Figure 18:
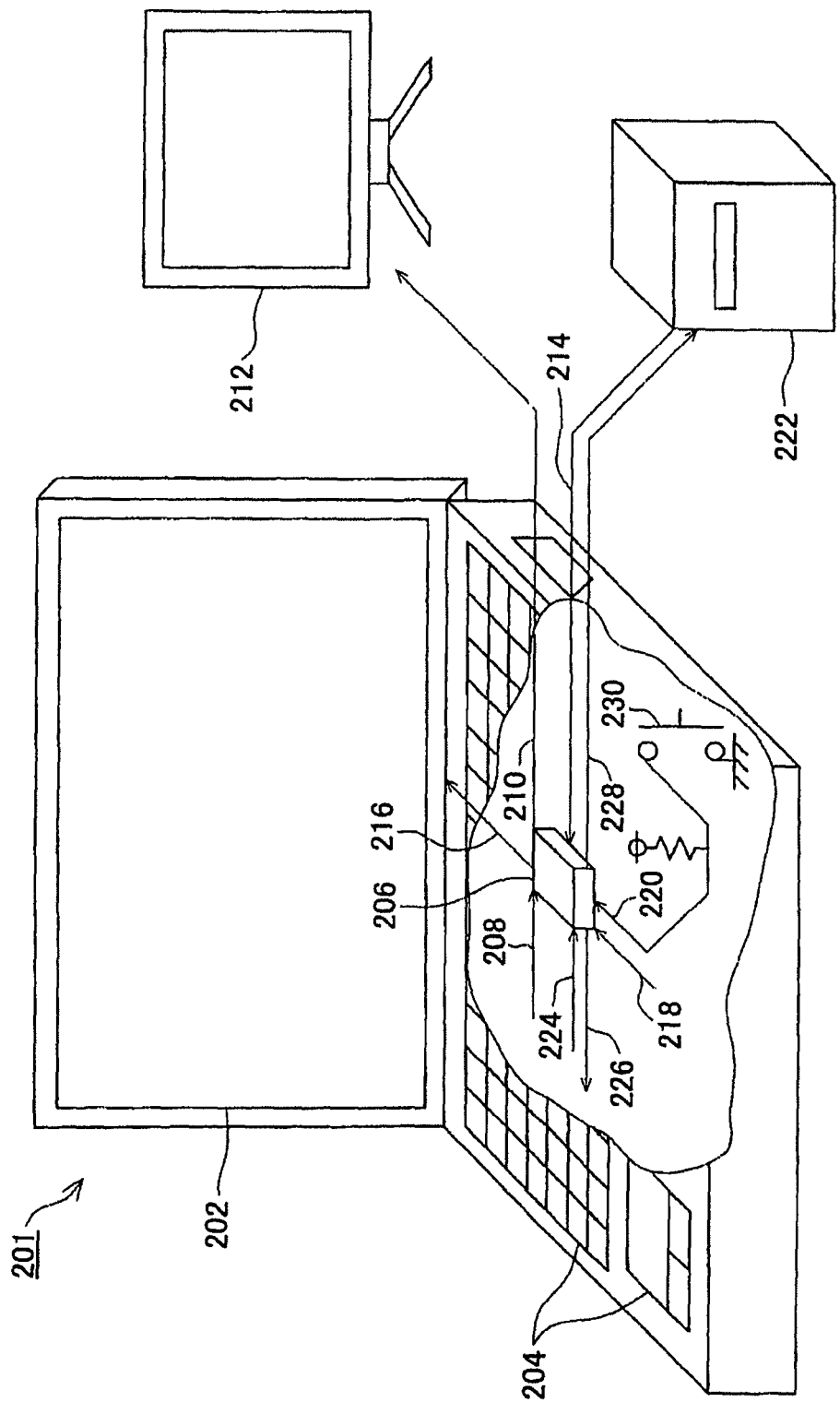
FIG. 18 is a perspective view (partially exploded view) of a computer according to an $11^{th}$ embodiment of the present invention.
Figure 19:
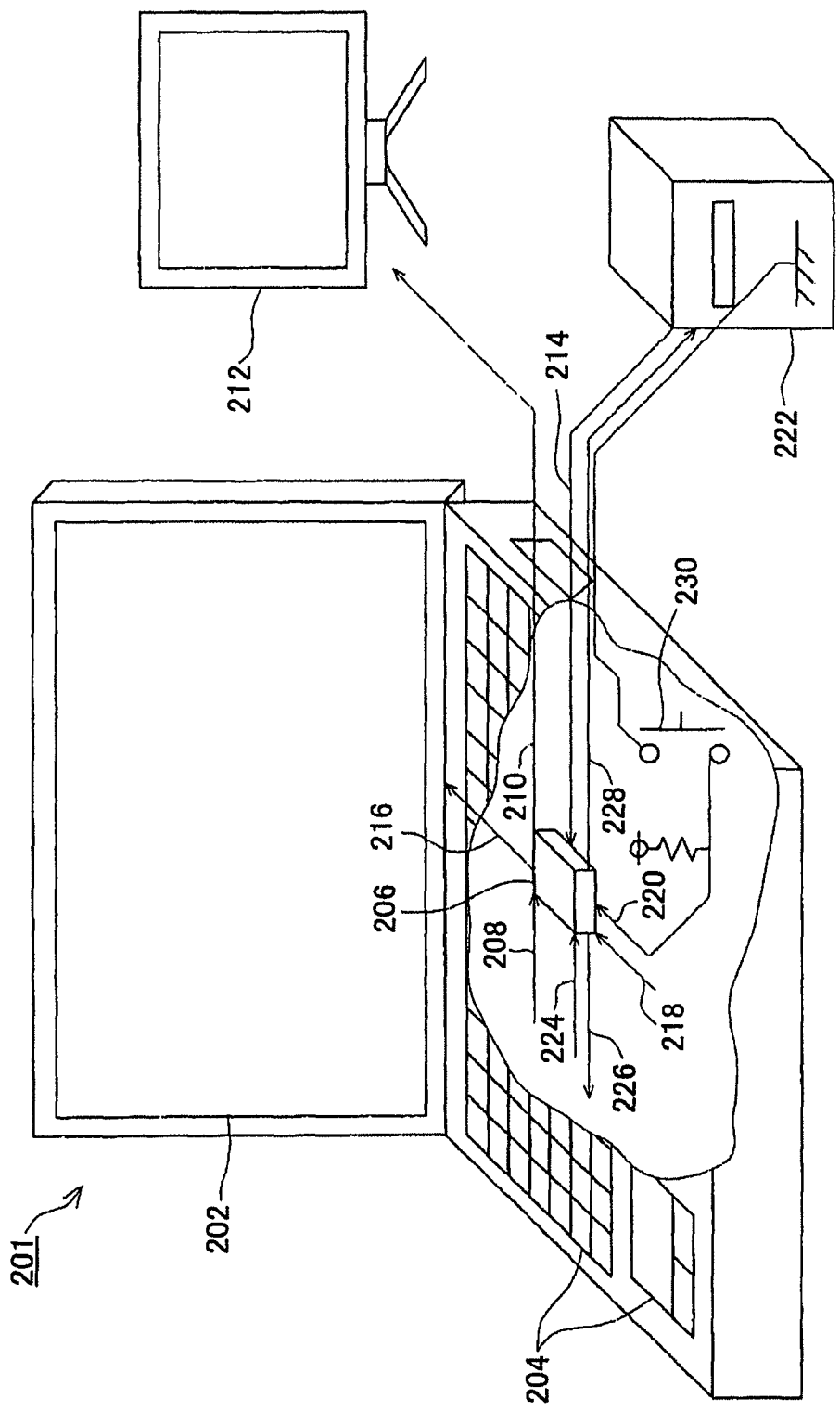
FIG. 19 is another perspective view (partially exploded view) of the computer according to the $11^{th}$ embodiment of the present invention.

FIGS. 18 and 19 are perspective views (partially exploded views) of the computer 201 according to an 11th embodiment of the present invention. The 11th embodiment is almost the same as the tenth embodiment. Therefore, a description is given below, focusing mainly on the difference therebetween.

In the computer 201 according to the 11th embodiment, a change switch 230 is provided to the switch signal B 220 of the image input/output switching unit 206. As a result, input and output of the image input/output switching unit 206 can be manually switched.

In the configuration shown in FIG. 18, the computer 201 has the change switch 230 added to the switch signal B 220 of the image input/output switching unit 206. When the change switch 230 is switched ON, the state of the switch signal B 220 changes from "H" to "L." At this point, the input/output interface of the image input/output switching unit 206 switches to "input mode," so that the image input signal B 214 of the external computer 222 is displayed on the image output device 202 of the computer 201 via the image output signal A 216.

When the change switch 230 is switched OFF, the switch signal B 220 becomes "H." At this point, by combining operation of the switch signal A 218, it is also possible to display the image input signal A 208 on the image output device 202 of the computer 201 via the image output signal A 216 without putting the input/output interface of the image input/output switching unit 206 in the state of outputting.

On the other hand, in the configuration shown in FIG. 19, the computer 201 has an input signal that detects connection of the external computer 222 assigned to a terminal of the external image output interface. This signal is connected to the switch signal B 220 of the image input/output switching unit 206, and has a pull-up resistor and the change switch 230 added thereto on the way to the switch signal B 220. A corresponding terminal of the external computer 222 is grounded. When the external computer 222 is connected to the external image output interface of the computer 201, the switch signal B 220 changes from "H" to "L" if the change switch 230 is ON. At this point, the input/output interface of the image input/output switching unit 206 switches to "input mode," so that the image input signal B 214 of the external computer 222 is displayed on the image output device 202 of the computer 201 via the image output signal A 216.

If the change switch 230 is switched OFF in this state, the switch signal B 220 changes to "H." At this point, by combining operation of the switch signal A 218, it is also possible to display the image input signal A 208 on the image output device 202 of the computer 201 via the image output signal A 216 without putting the input/output interface of the image input/output switching unit 206 in the state of outputting.

The change switch 230 shown in FIG. 19 may be disposed outside the computer 201. For example, the change switch 230 may be disposed on the interface between the computer 201 and the external computer 222 or on the external computer 222.

[12th Embodiment]

Figure 20:
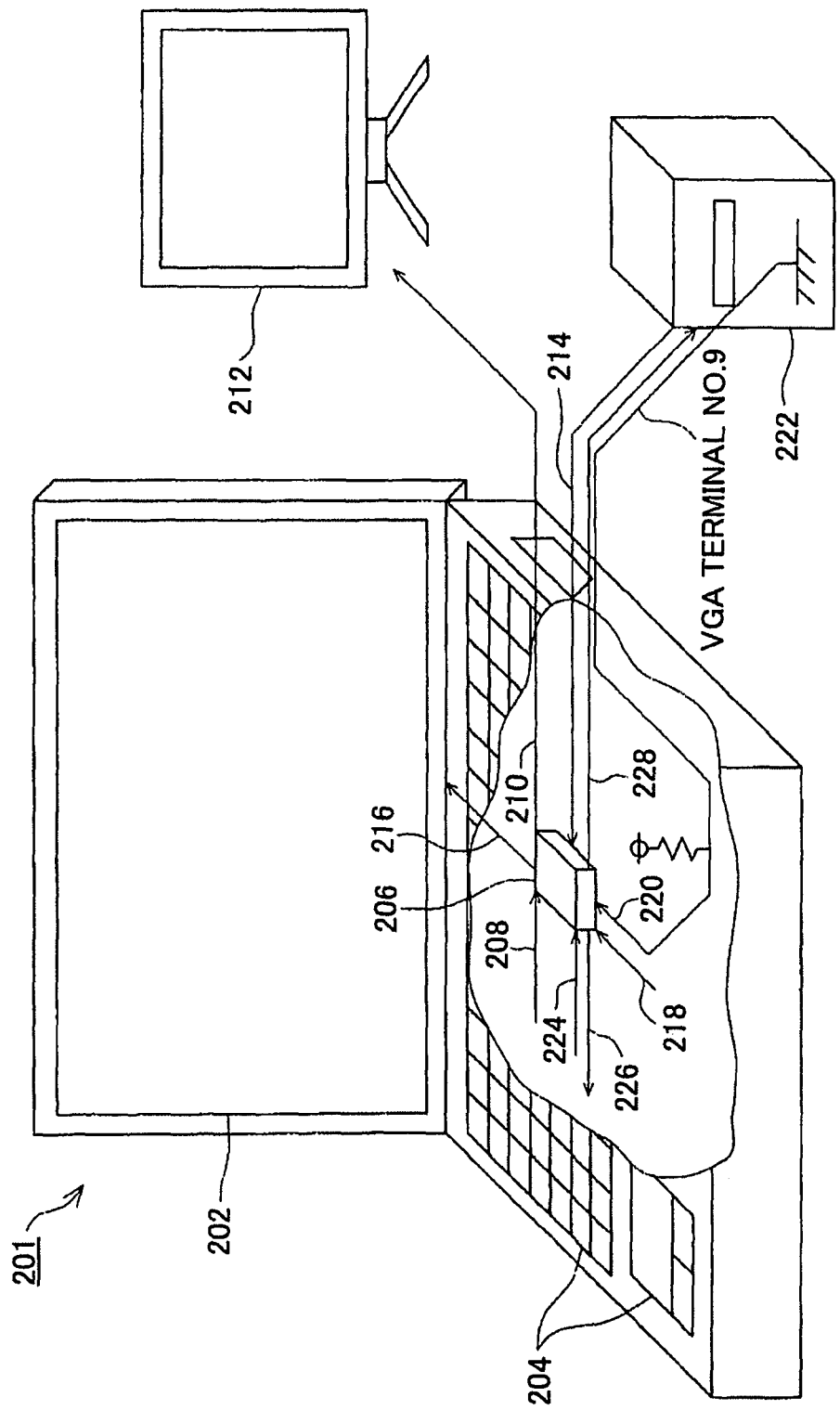
FIG. 20 is a perspective view (partially exploded view) of a computer according to a $12^{th}$ embodiment of the present invention.

FIG. 20 is a perspective view (partially exploded view) of the computer 201 according to a 12th embodiment of the present invention. According to the 12th embodiment, an input signal that detects connection of an external computer is assigned to a signal already assigned to an external image output interface in a computer such as a notebook personal computer, and the signal is connected to a switch signal of an image input/output switching unit, thereby changing input and output of the image input/output switching unit.

In the computer 201 shown in FIG. 20, an input signal that detects connection of the external computer 222 is assigned to +5 VDC of Terminal 9 of the conventional external image output interface. This signal is connected to the switch signal B 220 of the image input/output switching unit 206, and at the same time, a pull-up resistor to 5 V power supply is added to the signal. A corresponding terminal of the external computer 222 is grounded.

In this case, in response to connecting the external computer 222 to the external image output interface of the computer 201, the switch signal B 220 changes from "H" to "L." As a result, the input/output interface of the image input/output switching unit 206 switches to "input mode," so that the image input signal B 214 of the external computer 222 is displayed on the image output device 202 of the computer 201 via the image output signal A 216.

FIG. 21 is a list showing a VGA (VESA DDC) terminal layout according to the 12th embodiment. As shown in FIGS. 20 and 21, a pull-up resistor to 5 V power supply is added to +5 VDC of Terminal No. 9, which is 5 V output, and +5 VDC is connected to the switch signal B 220 of the image input/output switching unit 206. As a result, when the external image output is connected, 5 V is output. Accordingly, it is possible to achieve expansion while maintaining compatibility with the existing image output interface.

[13th Embodiment]

According to a 13th embodiment of the present invention, an input signal that detects connection of an external computer is assigned to a signal assigned as unused or reserved in an external image output interface in a computer such as a notebook personal computer, and the signal is connected to a switch signal of an image input/output switching unit, thereby switching input and output of the image input/output switching unit. A perspective view (partially exploded view) of a computer according to the 13th embodiment is substantially the same as FIG. 20.

FIG. 22 is a list showing a VGA (VESA DDC) terminal layout according to the 13th embodiment. In the computer 201 (FIG. 20) according to the 13th embodiment, an input signal that detects connection of the external computer 222 is assigned to the reserved terminal of Terminal 4 of the conventional external image output interface. This signal is connected to the switch signal B 220 of the image input/output switching unit 206, and has a pull-up resistor added thereto. A corresponding terminal of the external computer 222 is grounded.

In this case, by connecting the external computer 222 to the external image output interface of the computer 201, the switch signal B 220 changes from "H" to "L." As a result, the input/output interface of the image input/output switching unit 206 switches to "input mode," so that the image input signal B 214 of the external computer 222 is displayed on the image output device 202 of the computer 201 via the image output signal A 216.

According to the 13$^{th}$ embodiment, by adding a pull-up resistor to Terminal 4, which is a reserved terminal, and connecting Terminal 4 to the switch signal B 220 of the image input/output switching unit 206, it is possible to achieve expansion while maintaining compatibility with the existing external image output interface.

[14$^{th}$ Embodiment]

Figure 23A:
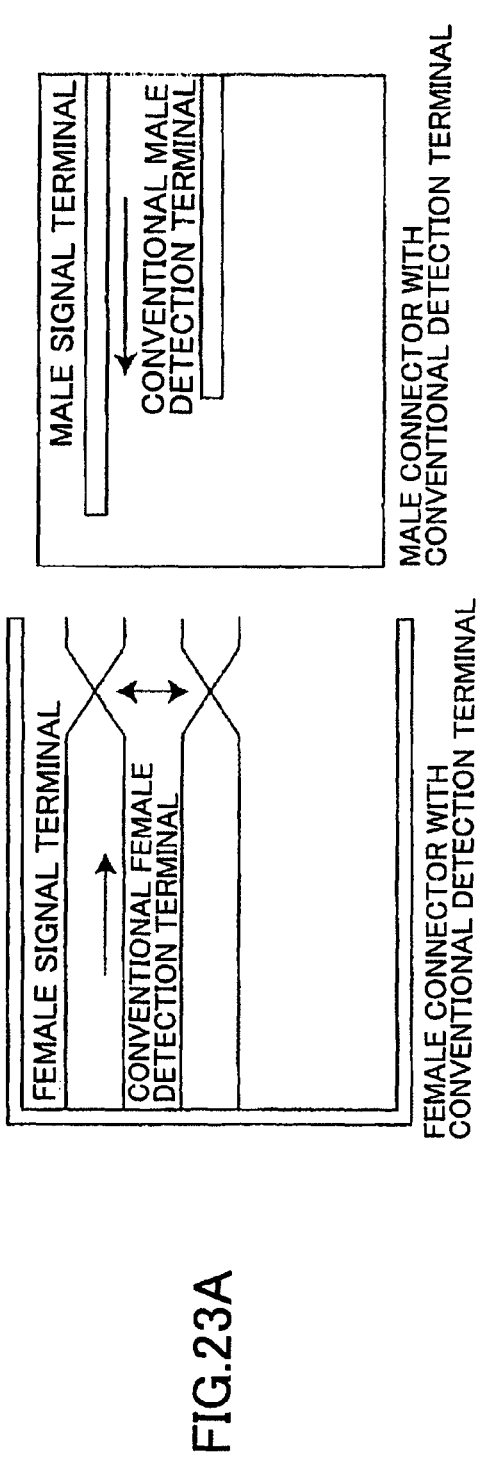
FIG. 23A is a schematic diagram showing connectors each having a conventional detection terminal.

A 14$^{th}$ embodiment of the present invention relates to, for example, terminals and a connector forming an external image output interface in a computer. FIG. 23A is a schematic diagram showing connectors each having a conventional detection terminal. FIGS. 23B and 24A through 24C are schematic diagrams showing a connector having detection terminals in a computer and a connector having detection terminals on the external computer side according to the 14$^{th}$ embodiment of the present invention. According to the 14$^{th}$ embodiment, by employing multiple detection terminals that are different in length, the state of a signal or bus that performs data transmission is changed using the difference between detection terminals in the time required before contacting.

First, FIG. 23A is a schematic diagram showing connectors each having a conventional detection terminal. In the male connector, the detection terminal is shorter than the signal terminal so that the signal terminals come into contact with each other first at the time of insertion. As a result, the contact of the signal terminals is more stable by the time the detection terminals come into contact with each other. In the case of outputting a signal in each of the male connector (on the right) and the female connector (on the left) in this structure, the collision of signals may occur to destroy data and degrade, damage, or destroy an apparatus when the signal terminals come into contact with each other. Further, since the detection terminal and the signal terminal of the female connector have the same length, the detection terminals come into contact with each other within a short period of time after the signal terminals come into contact with each other.

Figure 23B:
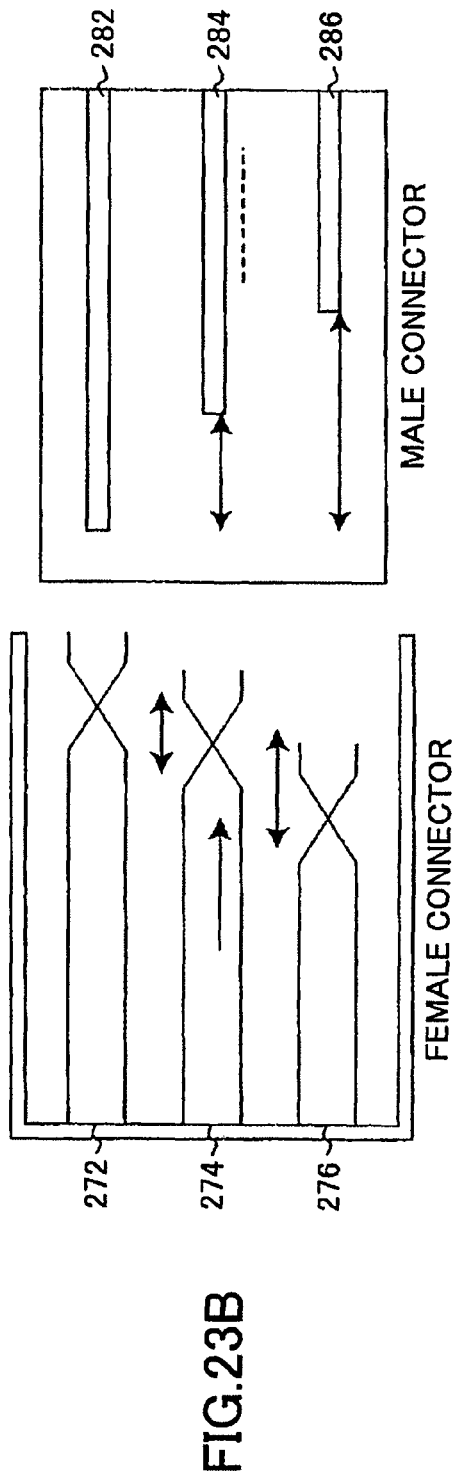
FIG. 23B is a schematic diagram showing a connector having detection terminals in a computer and a connector having detection terminals on the external computer side according to a $14^{th}$ embodiment of the present invention.

According to the 14$^{th}$ embodiment, each of the male and female connectors has multiple detection terminals different in length from each other as shown in FIG. 23B. The female connector has a female detection terminal A 272, a female signal terminal 274, and a female detection terminal B 276. The female detection terminal A 272 is longer than the female signal terminal 274. The female detection terminal B 276 is shorter than the female signal terminal 274. The male connector has a male detection terminal A 282, a male signal terminal 284, and a male detection terminal B 286. The male detection terminal A 282 is longer than the male signal terminal 284. The male detection terminal B 286 is shorter than the male signal terminal 284. The time between the contact of the detection terminals A 272 and 282 and the contact of the signal terminals 274 and 284 is longer than conventionally, and the time between the contact of the signal terminals 274 and 284 and the contact of the detection terminals B 276 and 286 is also longer than conventionally.

In this case, it is assumed that when the connectors are not connected, a signal on the female connector side is output, and a signal on the male connector side is not output. Further, it is assumed that when the connectors are connected, a signal on the female connector side is in input mode, and a signal on the male connector side is output.

Figure 24A:
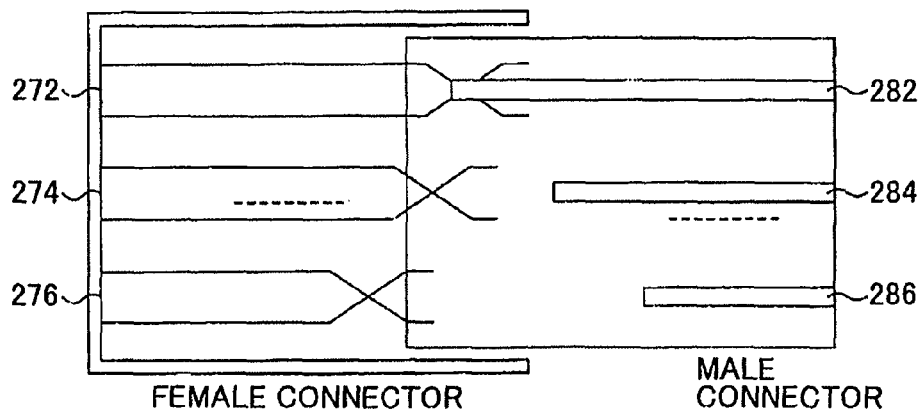
FIGS. 24A through 24C are schematic diagrams showing the connector having the detection terminals in the computer and the connector having the detection terminals on the external computer side according to the $14^{th}$ embodiment of the present invention.
Figure 24B:
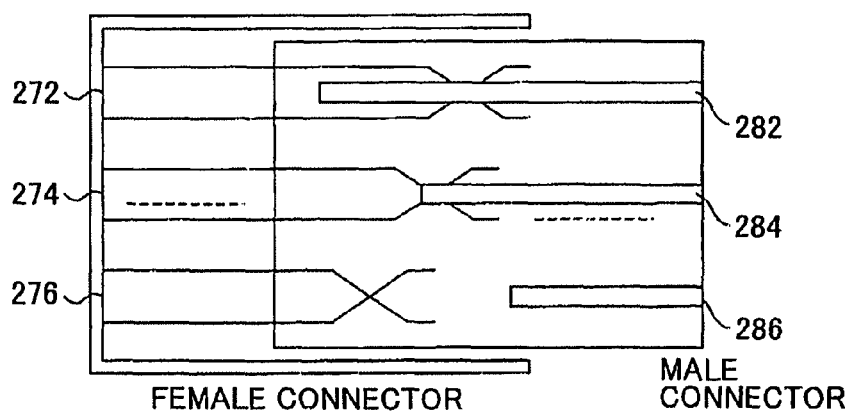

As shown in FIG. 24A, when connection of the connectors is started and the detection terminals A 272 and 282 come into contact with each other, an input/output switch signal on the female connector side is controlled to be switched to input mode. When the connection of the connectors is continued, the signal terminals 274 and 284 come into contact with each other after the detection terminals A 272 and 282 come into contact with each other as shown in FIG. 24B. At this point, since the female signal terminal 274 is shorter than the conventional female signal terminal, a longer period of time is required before the contact of the signal terminals 274 and 284. Therefore, the contact of the signal terminals 274 and 284 is made with more allowance of time for switching from output mode to input mode and state transition due to the contact of the detection terminals A 272 and 283.

Figure 24C:
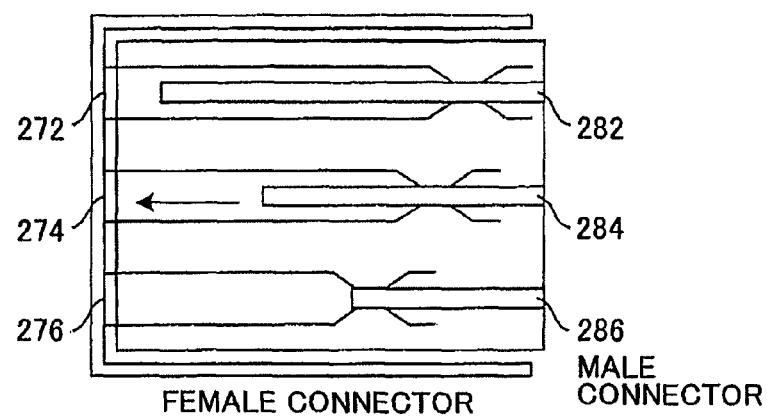

When the connection of the connectors is further continued, the detection terminals B 276 and 286 come into contact with each other after the signal terminals 274 and 284 come into contact with each other as shown in FIG. 24C. An output control terminal on the male connector side is controlled by the contact of the detection terminals B 276 and 286, so that a signal is output to the signal terminal 284. At this point, since the detection female terminal B 276 is shorter than the female signal terminal 274 and the female detection terminal A 272, a longer period of time is required before the female detection terminal B 276 comes into contact with the male detection terminal B 286. Accordingly, the contact of the detection terminals B 276 and 286 is made with more allowance of time for switching from output mode to input mode and state transition due to the contact of the detection terminals A 272 and 283, and further for stabilizing the contact of the signal terminals 274 and 284.

[15$^{th}$ Embodiment]

Figure 25:
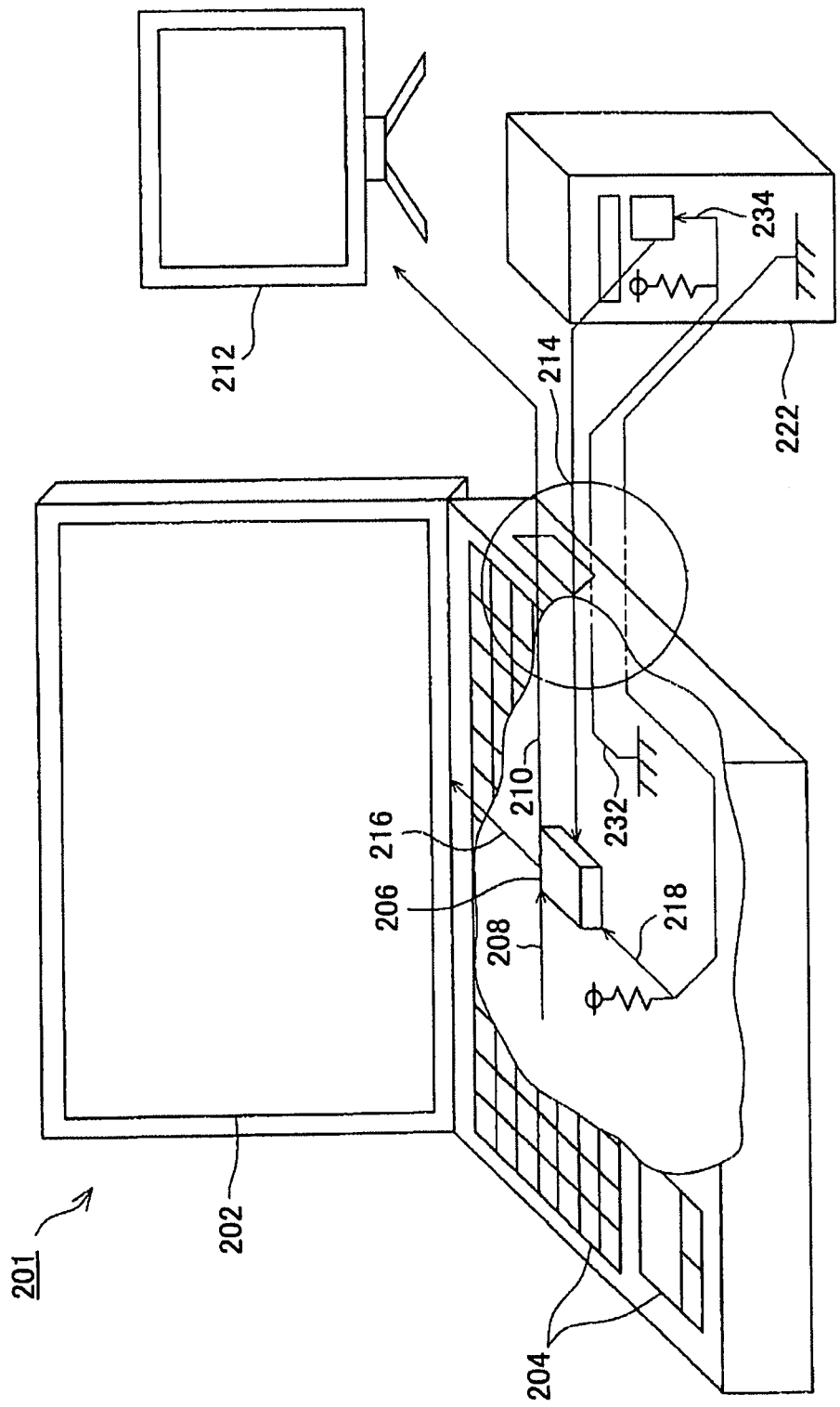
FIG. 25 is a perspective view (partially exploded view) of a computer according to a $15^{th}$ embodiment of the present invention.
Figure 26:
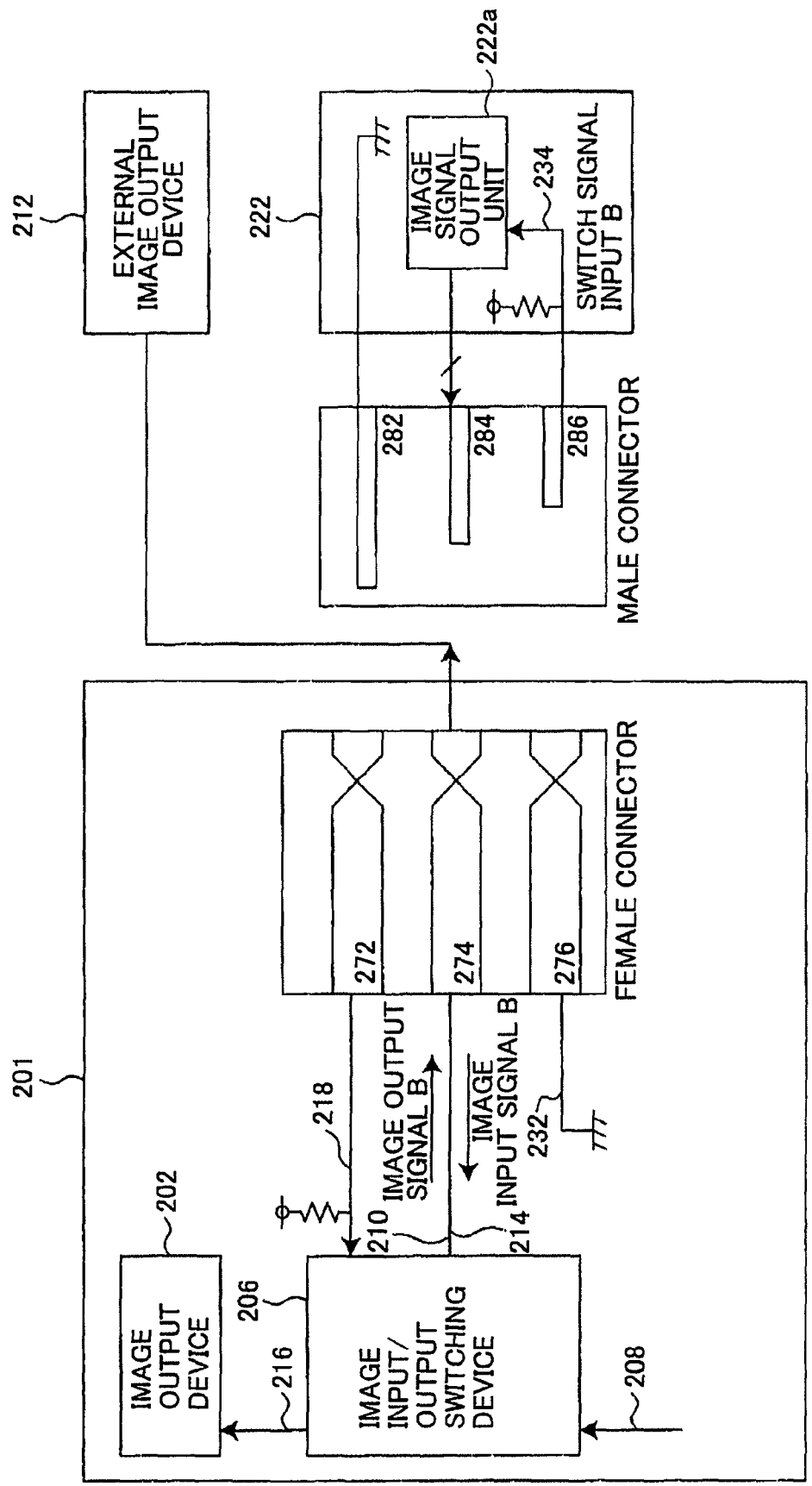
FIG. 26 is a block diagram showing the computer according to the $15^{th}$ embodiment of the present invention.

FIG. 25 is a perspective view (partially exploded view) of the computer 201 according to a 15$^{th}$ embodiment of the present invention. FIG. 26 is a block diagram showing the computer 201 according to the 15$^{th}$ embodiment. In the computer 201 according to the 15$^{th}$ embodiment, using the multiple detection terminals different in length according to the 14$^{th}$ embodiment, the input/output of the image signal of the computer 201 and the output of the external computer 222 are controlled based on time difference. Further, the output to the external image output device 212 and the input of the external computer 222 are switched depending on the connection.

In the computer 201 according to the 15$^{th}$ embodiment, an input signal that detects connection of the external computer 222 and a signal 232 that controls the image output control terminal of the external computer 222 are assigned to terminals of the conventional external image output interface. The former signal is connected to the switch signal A 218 of the image input/output switching unit 206 of the computer 201, and has a pull-up resistor added thereto. A corresponding terminal on the external computer 222 side is grounded. On the other hand, the latter signal 232 is connected to the image output control terminal of an image signal output unit 222a (FIG. 26) of the external computer 222 with a pull-up resistor being added thereto (in the external computer 222). A corresponding terminal on the computer 201 side is grounded.

The image input/output switching unit 206 outputs the image output signal B 210 when the state of the input switch signal A 218 is "H," and stops outputting the image output signal B 210 to be in the state of inputting when the state of the input switch signal A 218 is "L." The image signal output unit 222a provided in the external computer 222 stops outputting the image input signal B 214 when the input switch signal A 218 is "H," and outputs the image input signal B 214 when the input switch signal A 218 is "L."

As shown in FIG. 26, when the female connector on the computer 201 side and the male connector on the external computer 222 side are not connected, the switch signal A 218 is "H," and the image input signal A 208 of the computer 201 is output as the image output signal B 210 via the image input/output switching unit 206 to be displayed on the external image output device (external monitor) 212. When connection of the connectors is started, first, the detection terminals A 272 and 282 come into contact with each other, so that the switch signal A 218 changes from "H" to "L." As a result, the image input/output switching unit 206 stops outputting the image output signal B 210; so that the image signal terminal 274 is in the state of inputting. When the connection of the connectors is continued, the image signal terminals 274 and 284 come into contact with each other. When the connection of the connectors is further continued, the detection terminals B 276 and 286 come into contact with each other, so that the image input signal B 214 is output from the image signal output unit 222a of the external computer 222, and is displayed on the image output device (main body monitor) 202 of the computer 201 via the image signal terminals 274 and 284.

Figure 27:
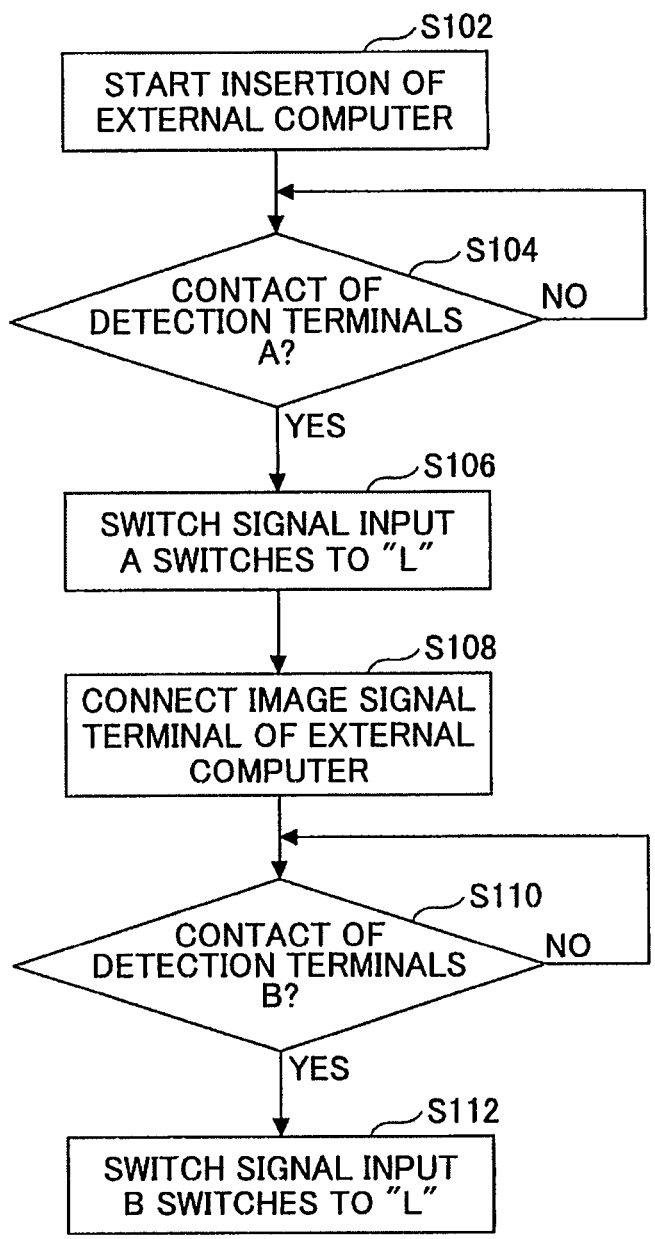
FIG. 27 is a flowchart showing state transition in the computer according to the 15th embodiment of the present invention.

FIG. 27 is a flowchart showing these transitions. In step S102, insertion of the external computer 222 is started with the computer 201 outputting the image output signal B 210 and the external computer 222 not outputting the image input signal B 214. Then, in step S104, it is determined whether the detection terminals A 272 and 282 have come into contact with each other. If YES in step S104, in step S106, the switch signal A 218 changes from "H" to "L." As a result, the image input/output switching unit 206 stops outputting the image output signal B 210 so as to wait for input of the image input signal B 214, which is not yet output from the external computer 222. Then, in step S108, the image signal terminal 284 on the external computer 222 side comes into contact with the female image signal terminal 274. Then, in step S110, it is determined whether the detection terminals B 276 and 286 have come into contact with each other. If YES in step S110, in step S112, the state of a switch signal input B 234 changes from "H" to "L," so that the image input signal B 214 is output from the external computer 222 to be input to the computer 201 and displayed on the image output device (main body monitor) 202 of the computer 201 via the image signal terminals 274 and 284.

FIG. 28 is a list showing a VGA (VESA DDC) terminal layout according to the 15$^{th}$ embodiment of the present invention. In the computer 201 according to the 15$^{th}$ embodiment, an input signal that detects connection of the external computer 222 and the signal 232 that controls the image output control terminal of the external computer 222 are assigned to signals assigned as unused or reserved in the conventional external image output interface. As a result, it is possible to achieve expansion while maintaining compatibility with the existing external image output interface.

[16$^{th}$ Embodiment]

Figure 29A:
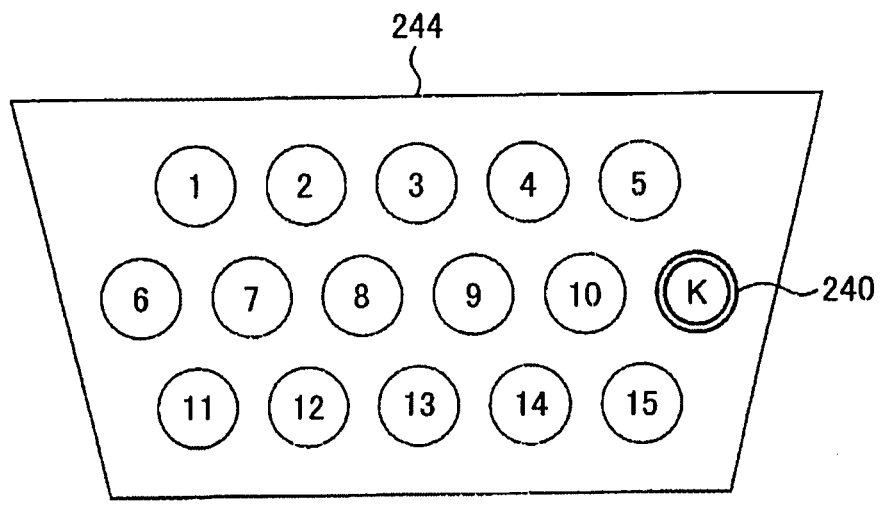
FIG. 29A is a schematic front view of an image signal male connector in a computer according to a 16th embodiment of the present invention.

FIG. 29A is a schematic front view of an image signal male connector 244 in a computer according to a 16$^{th}$ embodiment of the present invention. The 16$^{th}$ embodiment of the present invention focuses particularly on the connector part of the image output interface described above in the 14$^{th}$ and 15$^{th}$ embodiments.

In the 16$^{th}$ embodiment, as shown in FIG. 29A, the connector 244 has a projection 240 added thereto in order to prevent improper insertion. The projection 240 prevents the image signal male connector 244 according to the 16$^{th}$ embodiment from being connected physically to a conventional image signal female connector (FIG. 30B). This prevents improper insertion. Further, this allows the image signal male connector 244 according to the 16$^{th}$ embodiment to be connected to only an image signal female connector 246 having a hook hole 242 for receiving the projection 240 (FIG. 30A).

Figure 29B:
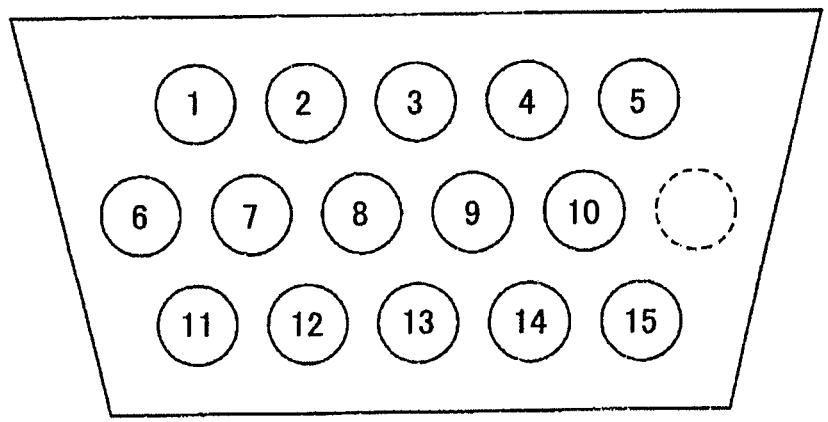
FIG. 29B is a schematic front view of a conventional image signal male connector.

On the other hands FIG. 29B is a schematic front view of a conventional image signal male connector. This male connector does not have a projection for preventing improper insertion. Accordingly, the conventional image signal male connector shown in FIG. 29B is connectable to either the conventional image signal female connector (FIG. 30B) or the image signal female connector 246 having the hook hole 242 for receiving the projection 240 (FIG. 30A).

[17$^{th}$ Embodiment]

Figure 30A:
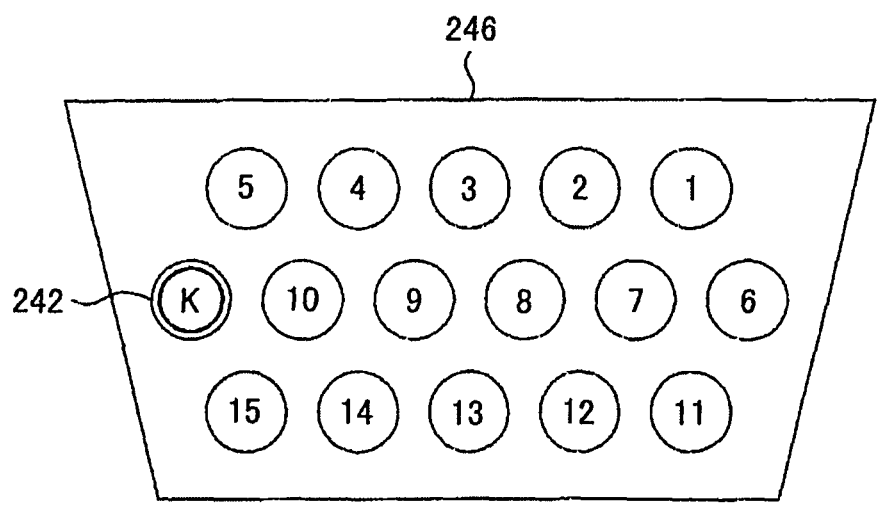
FIG. 30A is a schematic front view of a image signal female connector in a computer according to a 17th embodiment of the present invention.
Figure 30B:
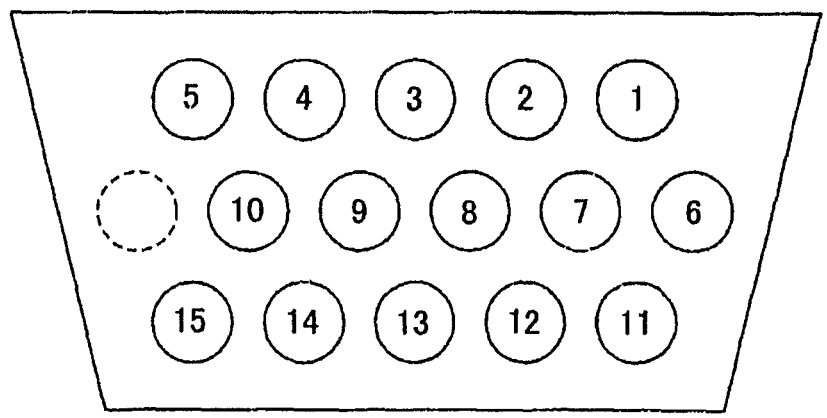
FIG. 30B is a schematic front view of a conventional image signal female connector.

FIG. 30A is a schematic front view of the image signal female connector 246 in a computer according to a 17$^{th}$ embodiment of the present invention. The 17$^{th}$ embodiment of the present invention also focuses particularly on the connector part of the image output interface described above in the 14$^{th}$ and 15$^{th}$ embodiments.

As shown in FIG. 30A, the image signal female connector 246 according to the 17$^{th}$ embodiment of the present invention has the hook hole 242 for receiving the projection 240 shown in the 16$^{th}$ embodiment. This hook hole 242 allows the image signal male connector 244 according to the 16$^{th}$ embodiment to be connected to the image signal female connector 246 according to the 17$^{th}$ embodiment.

On the other hand, FIG. 30B is a schematic front view of the conventional image signal female connector. This female connector does not have a hook hole for receiving the projection 240 of the image signal male connector 244 according to the 16$^{th}$ embodiment. Accordingly, the conventional image signal female connector of FIG. 30B can be connected to only the conventional image signal male connector (FIG. 29B), and cannot be connected to the image signal male connector 244 having the projection 240 according to the 16$^{th}$ embodiment of the present invention.

[18$^{th}$ Embodiment]

Figure 31:
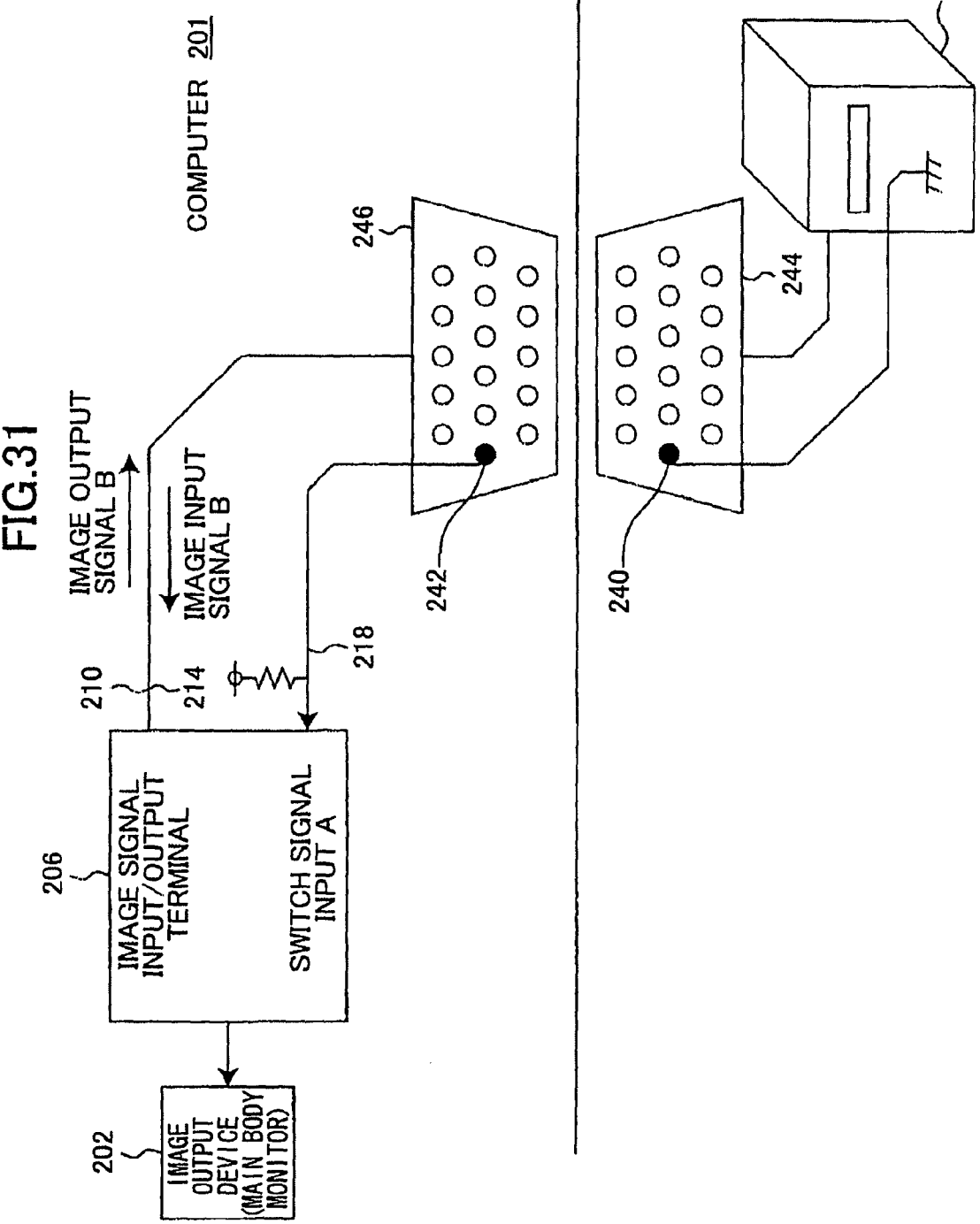
FIG. 31 is a block diagram showing a computer and an external computer in the case of using the image signal female connector in the computer and the image signal male connector on the external computer side according to an 18th embodiment of the present invention.

FIG. 31 is a block diagram showing the computer 201 and the external computer 222 in the case of using the image signal female connector 246 in the computer 201 and the image signal male connector 244 on the external computer 222 side according to an 18$^{th}$ embodiment of the present invention. The computer 201 and the external computer 222 are connected through the image signal female connector 246 according to the above-described 17$^{th}$ embodiment and the image signal male connector 244 according to the above-described 16$^{th}$ embodiment. Accordingly, the image signal female connector 246 has detection terminals and the hook hole 242 for preventing improper insertion. The hook hole 242 may also serve as a detection terminal. Likewise, the image signal male connector 244 has terminals and the projection 240 for preventing improper insertion. The projection 240 may also serve as a detection terminal.

As shown in FIG. 31, the projection 240 is added to the male connector 244 and the hook hole 242 is added to the female connector 246 at the external image output interface in order to prevent improper insertion. An input signal that detects connection of the external computer 222 is assigned to the detection terminals formed thereby. Further, these detection terminals are connected to the switch signal A 218 input of the image input/output switching unit 206 of the computer

201 with a pull-up resistor being added thereto. A corresponding terminal on the external computer 222 side is grounded.

The image input/output switching unit 206 outputs the image output signal B 210 when the switch signal A 218 is "H," and stops outputting the image output signal B 214 to be in the state of inputting when the switch signal A 218 is "L." Accordingly, when the connectors 244 and 246 are not connected, the switch signal A 218 is "H," so that the image output signal B 210 is output via the image input/output switching unit 206 of the computer 201 to be displayed on the external image output device (external monitor) 212.

When the connectors 244 and 246 are connected, the projection 240 and the hook hole 242 come in contact with each other so that the switch signal A 218 changes from "H" to "L." As a result, the image input/output switching unit 206 stops outputting the image output signal B 210, so that the image signal terminal is in the state of inputting. At this point, the image input signal B 214 output from the external computer 222 is input to the image signal terminal of the computer 201 to be displayed on the image output device 202 of the computer 201.

Figure 32:
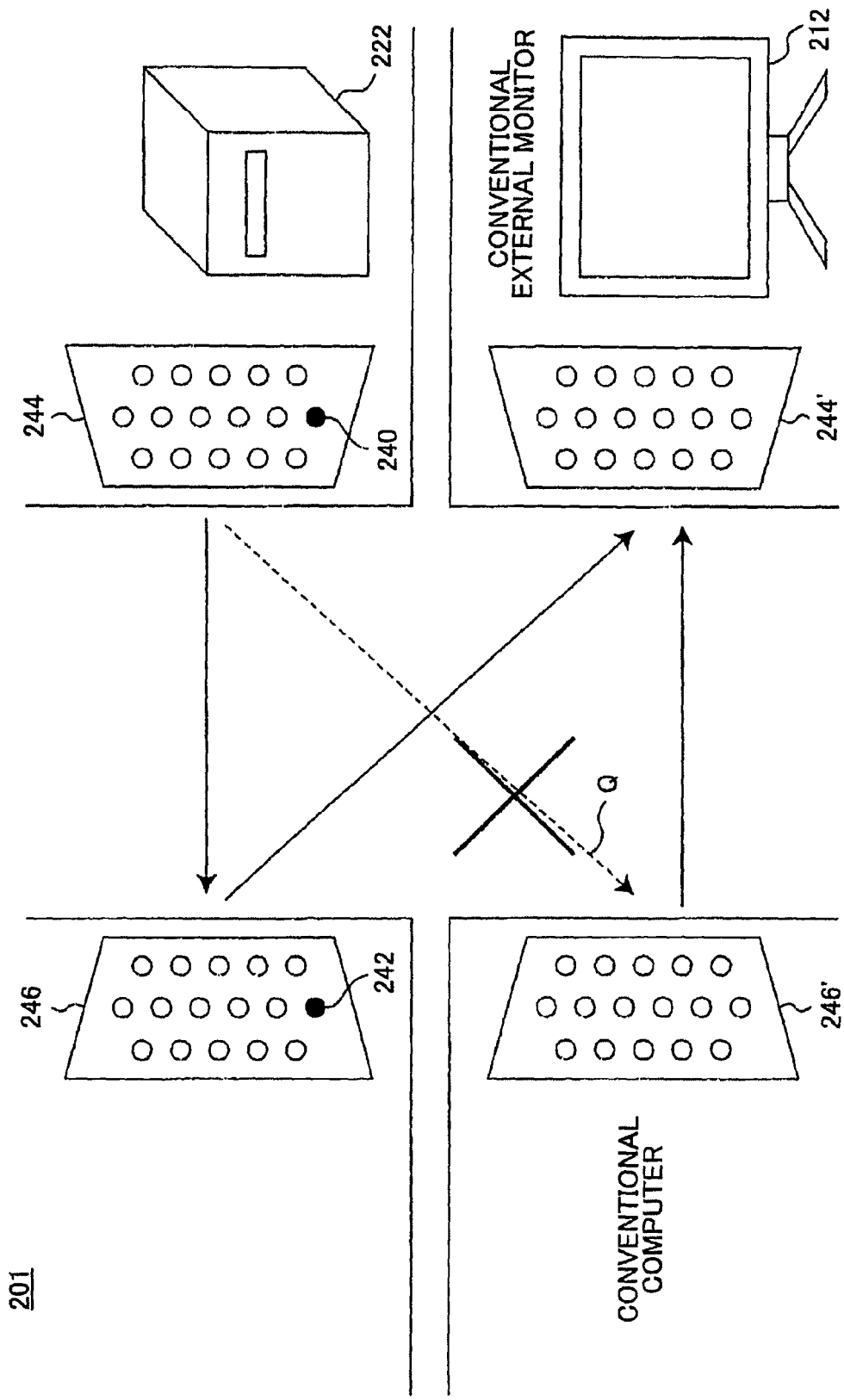
FIG. 32 is a diagram showing connection of the image signal female connector according to the 18th embodiment or a conventional image signal female connector and the image signal male connector according to the 18th embodiment or a conventional image signal male connector.

FIG. 32 is a diagram showing connection of the image signal female connector 246 according to the 18$^{th}$ embodiment or a conventional image signal female connector 246' and the image signal male connector 244 according to the 18$^{th}$ embodiment or a conventional image signal male connector 244'.

The conventional image signal male connector 244' is connectable to the image signal female connector 246 with the hook hole 242 and to the conventional image signal female connector 246'.

The male connector 244 with the projection 240 cannot be connected to the conventional image signal female connector 246' as indicated by broken arrow Q in FIG. 32. As a result, the conventional computer cannot receive an image signal of the external computer 222 according to one embodiment of the present invention. On the other hand, the male connector 244 with the projection 240 is connectable to the female connector 246 with the hook hole 242.

As a result, it is possible to maintain compatibility in the connection to the conventional external monitor, and it is also possible to prevent the external computer 222 according to one embodiment of the present intention from being connected to the conventional computer to cause malfunction.

[19$^{th}$ Embodiment]

Figure 33:
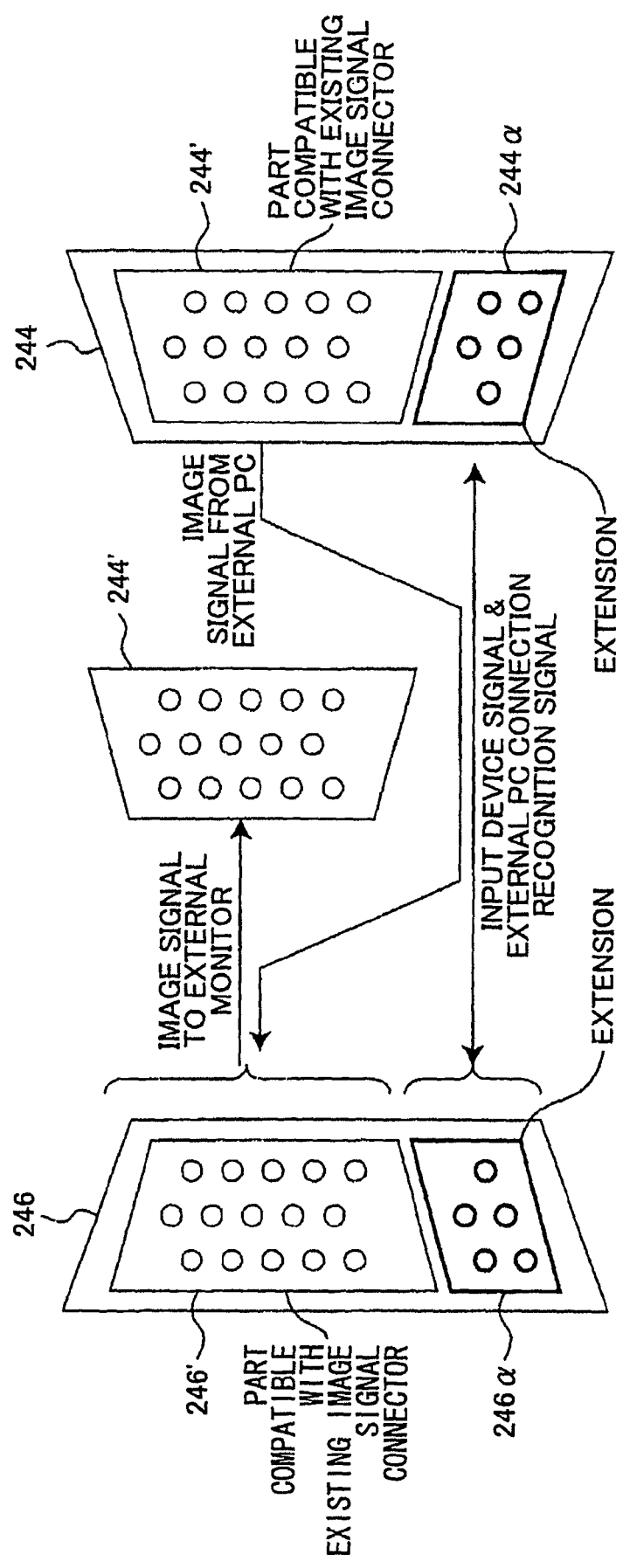
FIG. 33 is a schematic front view of the image signal female connector in a computer and the image signal male connector on the external computer side according to a 19th embodiment of the present invention.

FIG. 33 is a schematic front view of the image signal female connector 246 in the computer 201 and the image signal male connector 244 on the external computer 222 side according to a 19$^{th}$ embodiment of the present invention. The image signal female connector 246 is a female VGA connector having an extension for an external PC (computer) connection detection (recognition signal) and input device signals. The image signal male connector 244 is a male VGA connector having an extension for the external PC (computer) connection detection (recognition signal) and the input device signals. In the image signal female connector 246 and the image signal male connector 244 in FIG. 33, signal assignment is the same as the existing one (246' and 244') in principle, and connectors 246α and 244α are added as extensions to the image signal female connector 246 and the image signal male connector 244, respectively, for the connection detection (recognition) signal and the input device signals.

In the case of connecting an external monitor having the existing image signal male connector 244' to the image signal female connector 246 of the computer 201 in FIG. 33, it is possible to display an image of the computer 201 on the external monitor via the existing compatible part (246') of the image signal female connector 246.

In the case of connecting the external computer 222 according to this embodiment, not only the existing compatible part of each of the image signal connectors 244 and 246 but also the added connectors 244α and 246α are used. As a result, the computer 201 and the external computer 222 according to this embodiment can properly exchange signals. That is, since the connected detection signal operates the input device output switching and image input/output switching unit 206 of the computer 201, it is possible to input a signal of the input device of the computer 201 to the external computer 222, so that it is possible to display an image of the external computer 222 on the image output device 202 of the computer 201.

[20$^{th}$ Embodiment]

Figure 34:
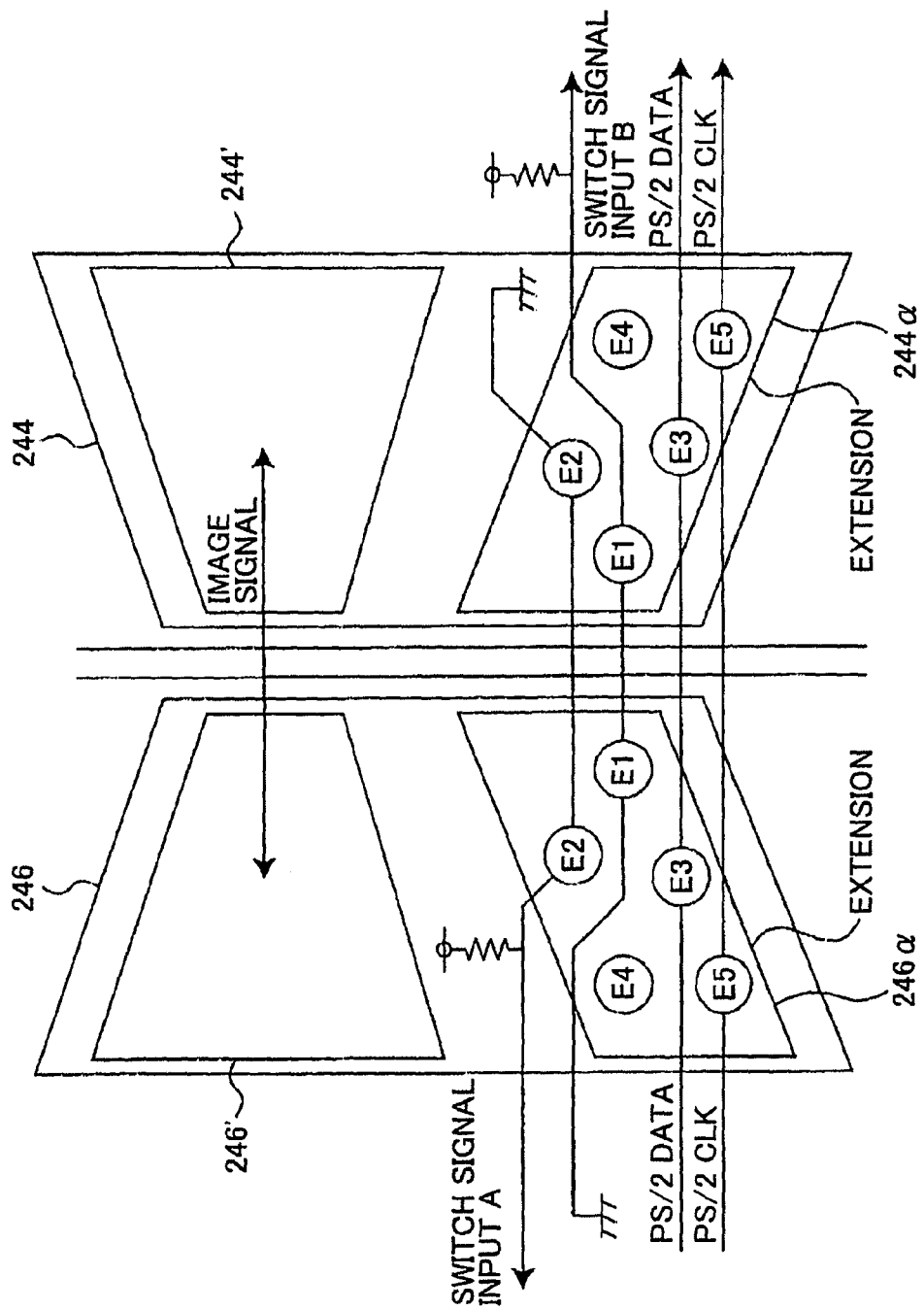
FIG. 34 is a schematic front view of the image signal female connector in a computer and the image signal male connector on the external computer side according to a 20th embodiment of the present invention, which is a specific example of the 19th embodiment.

FIG. 34 is a schematic front view of the image signal female connector 246 in the computer 201 and the image signal male connector 244 on the external computer 222 side according to a 20$^{th}$ embodiment of the present invention. The 20$^{th}$ embodiment is a specific example of the 19$^{th}$ embodiment. As is clear from the description of the 19$^{th}$ embodiment, each of the connectors 244 and 246 integrates an extension connector for the connection detection (recognition) signal and the input device signals and the existing image signal connector, so that in the case of using the external computer 222, it is possible to support its connection with a single connector on each of the computer 201 side and the external computer 222 side.

FIG. 35 is a list showing a VGA (VESA DDC) terminal layout in the computer 201 according to the 20$^{th}$ embodiment of the present invention. According to the list of FIG. 35, the input device signals of PS/2 DATA and PS/2 CLK are assigned to extension terminals E3 and E4, respectively, and the external PC image signal enabling signal and the external PC connection recognition signal are assigned to extension terminals E1 and E2, respectively. Regarding the image signal, the VGA terminal layout remains the same as the existing one.

In the case of connecting an external monitor having the existing image signal connector in the 20$^{th}$ embodiment, since the image signal connector is the same as the conventional one, it is possible for the computer 201 to display an image on the external monitor while maintaining compatibility with the conventional terminal layout. Further, in the case of connecting the external computer 222 according to the present invention, extension connectors having terminals regarding the connection detection (recognition) signal and the input device signals of extension and the image signal. At this point, it is possible to input a signal of the input device of the computer 201 to the external computer 222, and since the detection signal of the extension connector parts operates the input device output switching and image input/output switching unit 206 of the computer 201, it is possible to display an image of the external computer 222 on the image output device 202 of the computer 201.

[21$^{st}$ Embodiment]

Figure 36:
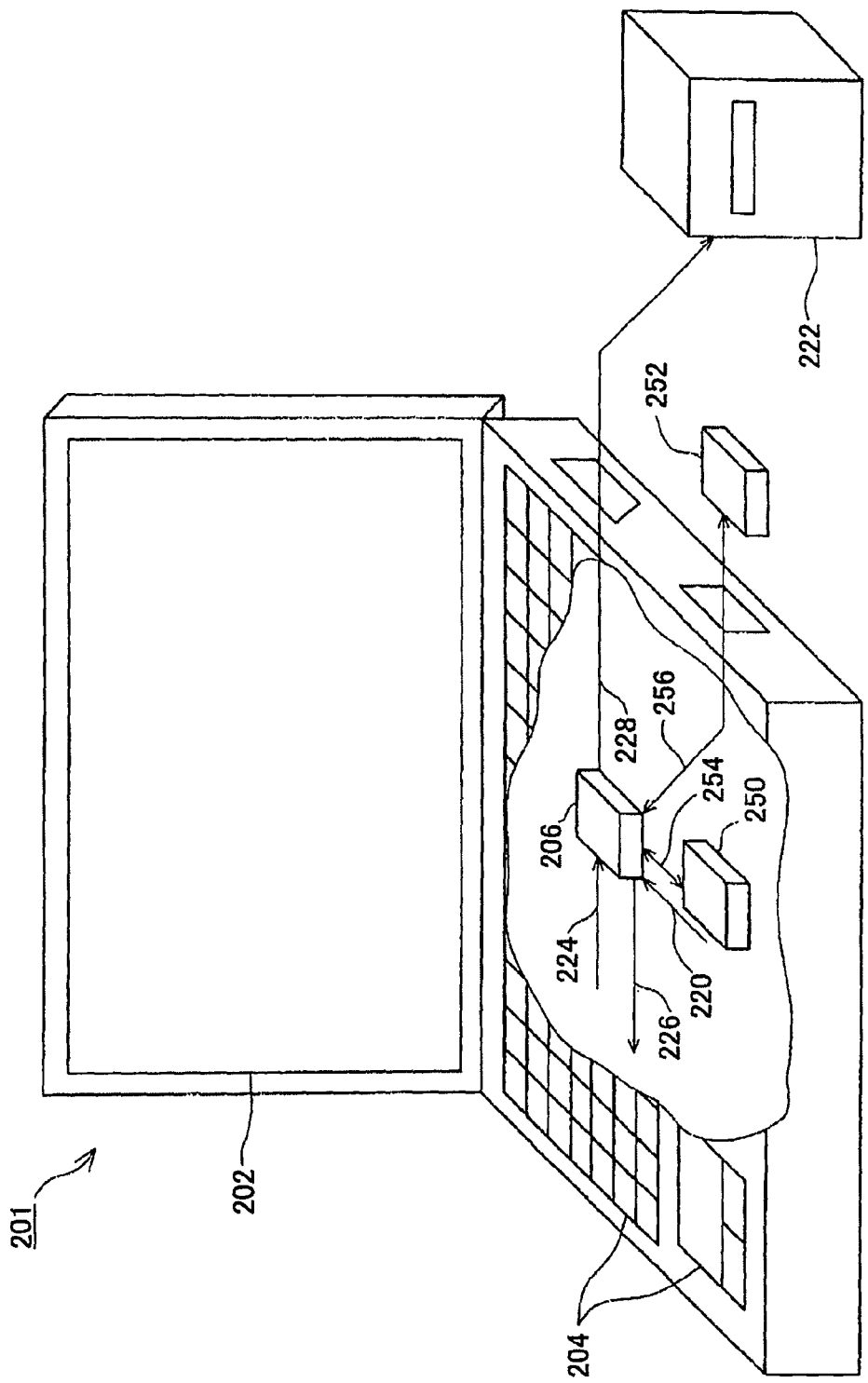
FIG. 36 is a perspective view (partially exploded view) of a computer according to a 21st embodiment of the present invention.

FIG. 36 is a perspective view (partially exploded view) of the computer 201 according to a 21$^{st}$ embodiment of the present invention. According to the 21$^{st}$ embodiment of the present invention, it is possible to use a built-in device of the computer 201 and an external peripheral device connected to the computer 201 from the external computer 222 connected to the computer 201. By way of example, those using a USB interface as an interface for outputting the input device signal of the computer 201 to the external computer 222 and those integrating a USB concentrator (hub) with the image input/output switching unit (input/output device output switching unit) 206 are assumed.

In the case where the external computer 222 is not connected, the switch signal B 220 is not activated, so that the input device input 224 is output to the input device output A 226 of the computer 201. At this point, an internal device 250 and an external peripheral device 252 connected to the concentrator (206) may be connected to the input device output A 226.

When the external computer 222 is connected, the switch signal B 220 is activated, so that the input device input 224 is output to the input device output B 228 of the computer 201 so as to be input to the external computer 222. At this point, the internal device 250 and the external peripheral device 252 connected to the concentrator (206) are connected to the input device output B 228. As a result, not only the input device 204 of the computer 201 but also the internal device 250 and the external peripheral device 252 are usable in the external computer 222. At this point, it may be determined, using another switch signal, whether to cause the internal device 250 and the external peripheral device 252 connected to the concentrator (206) to be connected to the input device output B 228.

[22$^{nd}$ Embodiment]

Figure 37:
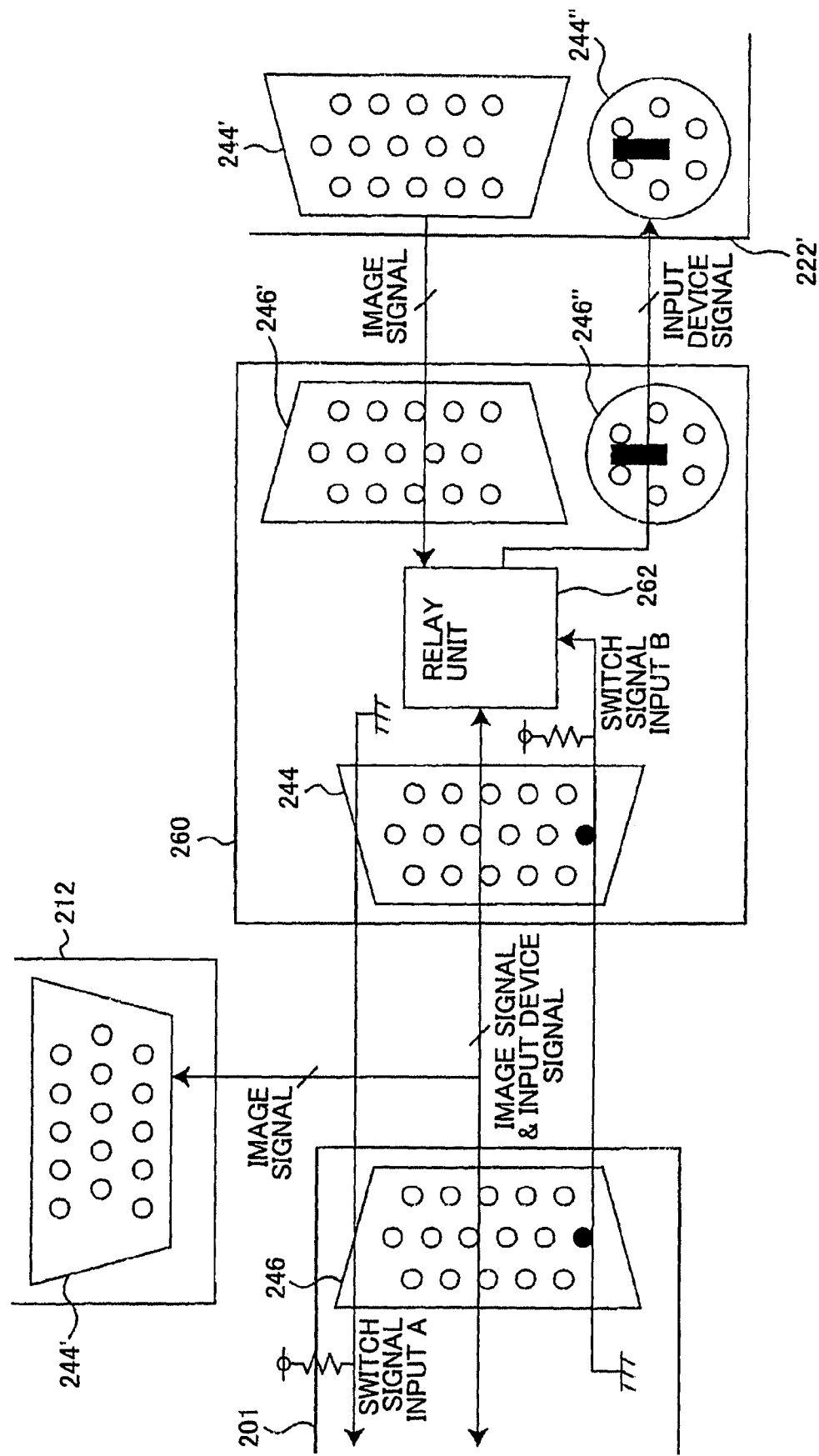
FIG. 37 is a block diagram showing the connectors in a computer, a conventional external computer, and an external computer relay device according to a 22nd embodiment of the present invention.

FIG. 37 is a block diagram showing the connectors 244, 246, 244' and 246' in the computer 201, a conventional external computer 222', and an external computer relay device 260 according to a 22$^{nd}$ embodiment of the present invention. According to the 22$^{nd}$ embodiment, in the case of connecting the conventional external computer 222' to the computer 201, the relay device 260 is disposed therebetween.

It is clear from the above description that the computer 201 according to the present invention is assumed to be connected to the external computer 222 according to the present invention. Accordingly, it is assumed that a predetermined operation may not be performed in the case of connecting the conventional external computer 222' to the computer 201 according to the present invention. The relay device 260 is provided in order to solve this problem.

The relay device 260 includes a relay unit 262 that controls output of an image signal input from the external computer 222'. The relay unit 262 outputs the image signal of the external computer 222' to the computer 201 side if the state of a switch signal input B having a pull-up resistor added thereto is "L," and does not output the image signal of the external computer 222' if the state of the switch signal input B is "H." Further, a signal to be connected to a switch signal input A having a pull-up resistor added thereto when the relay device 260 is connected to the computer 201 is grounded in the relay device 260.

The relay device 260 can separate an input device signal assigned from the computer 201 to the image signal interface, and direct the separated input device signal to a conventional input device interface (246"and 244"). Further, the relay device 260 uses the connector 244 having the improper insertion prevention projection 240 for preventing connection to computers other than the computer 201 according to the present invention. That is, by connecting the conventional external computer 222' to the relay device 260 and connecting the relay device 260 to the computer 201 according to the present invention, the conventional external computer 222' can be equivalent to the external computer 222 according to the present invention.

Further, a change switch (not graphically illustrated) that performs connection and disconnection may be provided to the switch signal input A and the switch signal input B of the relay device 260 so that the output of the image output device of the computer 201 main body can be switched by manually operating the change switch on the relay device 260.

[23$^{rd}$ Embodiment]

Figure 38:
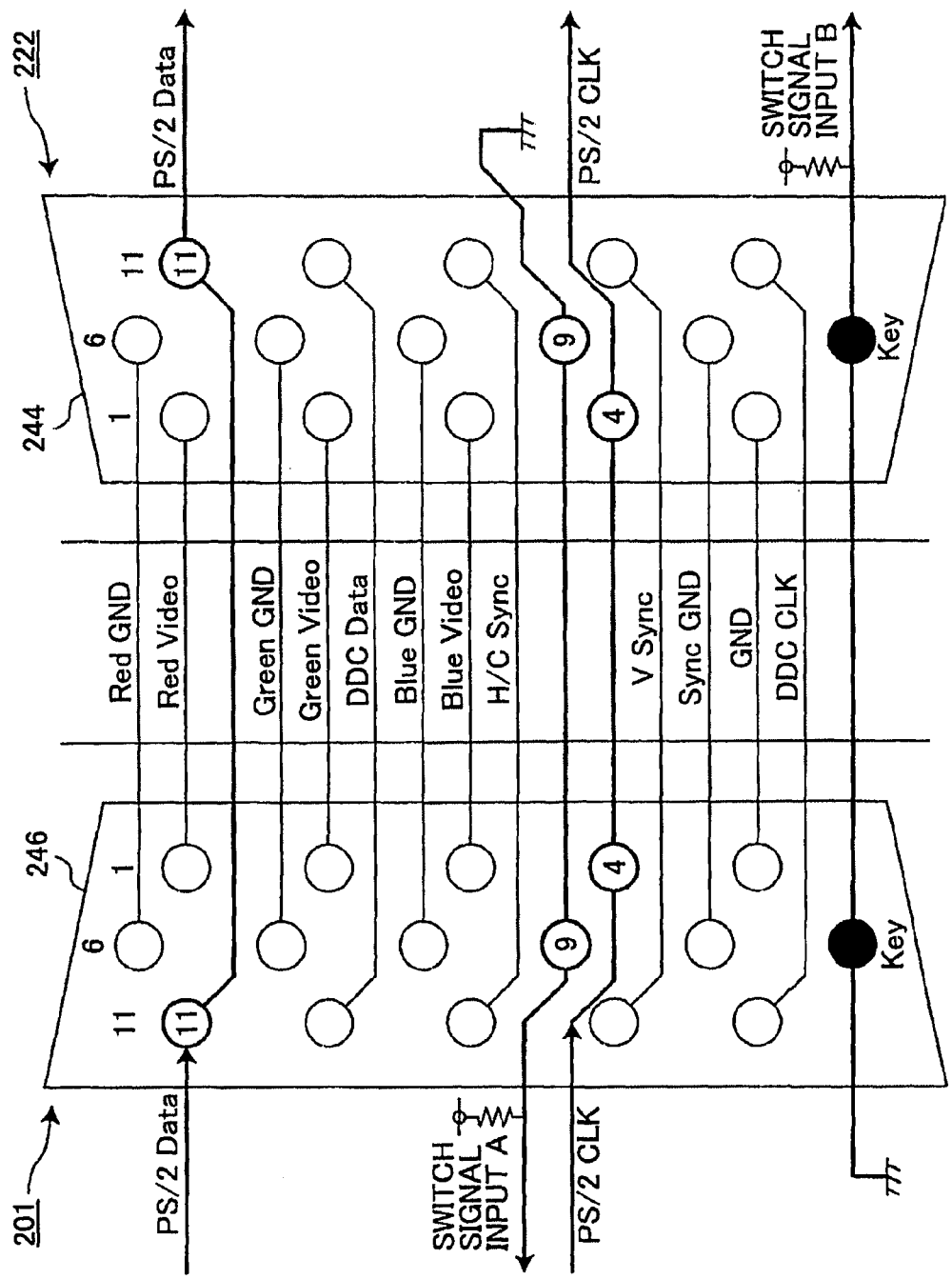
FIG. 38 is a schematic front view of the image signal female connector in a computer and the image signal male connector on the external computer 222 side according to a 23rd embodiment of the present invention.

A 23$^{rd}$ embodiment of the present invention relates to image signal interface connectors that integrate the features of the fifth, sixth, ninth, tenth, 12$^{th}$, 14$^{th}$, 15$^{th}$, 16$^{th}$, 17$^{th}$, and 18$^{th}$ embodiments. FIG. 38 is a schematic front view of the image signal female connector 246 in the computer 201 and the image signal male connector 244 on the external computer 222 side according to the 23$^{rd}$ embodiment of the present invention. FIG. 39 is a list showing a VGA (VESA DDC) terminal layout according to the 23$^{rd}$ embodiment.

According to the 23$^{rd}$ embodiment, the +5 VDC terminals of the image signal connectors 244 and 246 are assigned as detection terminals that have a +5 V pull-up resistor and detect connection of the external computer 222. When the connectors 244 and 246 are connected, the detection terminals come into contact with each other before all the other terminals come into contact. Therefore, first, the switch signal A 218 that controls the input/output of the image input/output switching unit 206 of the computer 201 changes from "H" to "L." As a result, the image signal output to the external image output device (external monitor) 212 is stopped, so that the image input/output switching unit 206 can switch to "input mode."

Since the image signal connector 244 and the image signal connector 246 have the projection 240 and the hook hole 242 for preventing improper insertion, respectively, the external monitor 212 having the conventional image signal male connector is connectable to the computer 201, but the external computer 222 cannot be connected to a computer such as a notebook computer having the conventional image signal female connector.

Further, the projection 240 and the hook hole 242 for preventing improper insertion are shorter than other terminals and assigned as detection terminals that detect connection of the external computer 222 at the time of connection of the connectors 244 and 246. That is, these detection terminals come into contact with each other after all the other terminals come into contact. As a result, the state of a switch signal B that controls the output of the external computer 222 changes from "H" to "L," so that an image signal of the external computer 222 is input to the computer 222 to be displayed on the image output device 202.

Further, by assigning the input device signals of PS/2 CLK and PS/2 DATA to the reserved signal of Terminal 4 and the ID0 signal of Terminal 11, which is normally not used, respectively, it is possible to connect the input device signals of the computer 222 to the external computer 222.

Thus, by providing the projection 240 and the hook hole 242 for preventing improper insertion also serving as detection signals (terminals), assigning input device signals used in the external computer 222 to signals assigned as unused and reserved, and further assigning an input signal that has a pull-up resistor to 5 V power supply and detects connection of the external computer 222 to terminals already assigned as +5 VDC in the image signal interface connectors 244 and 246, it is possible to expand functions while maintaining compatibility with the existing external image output interface.

[24$^{th}$ Embodiment]

Figure 40:
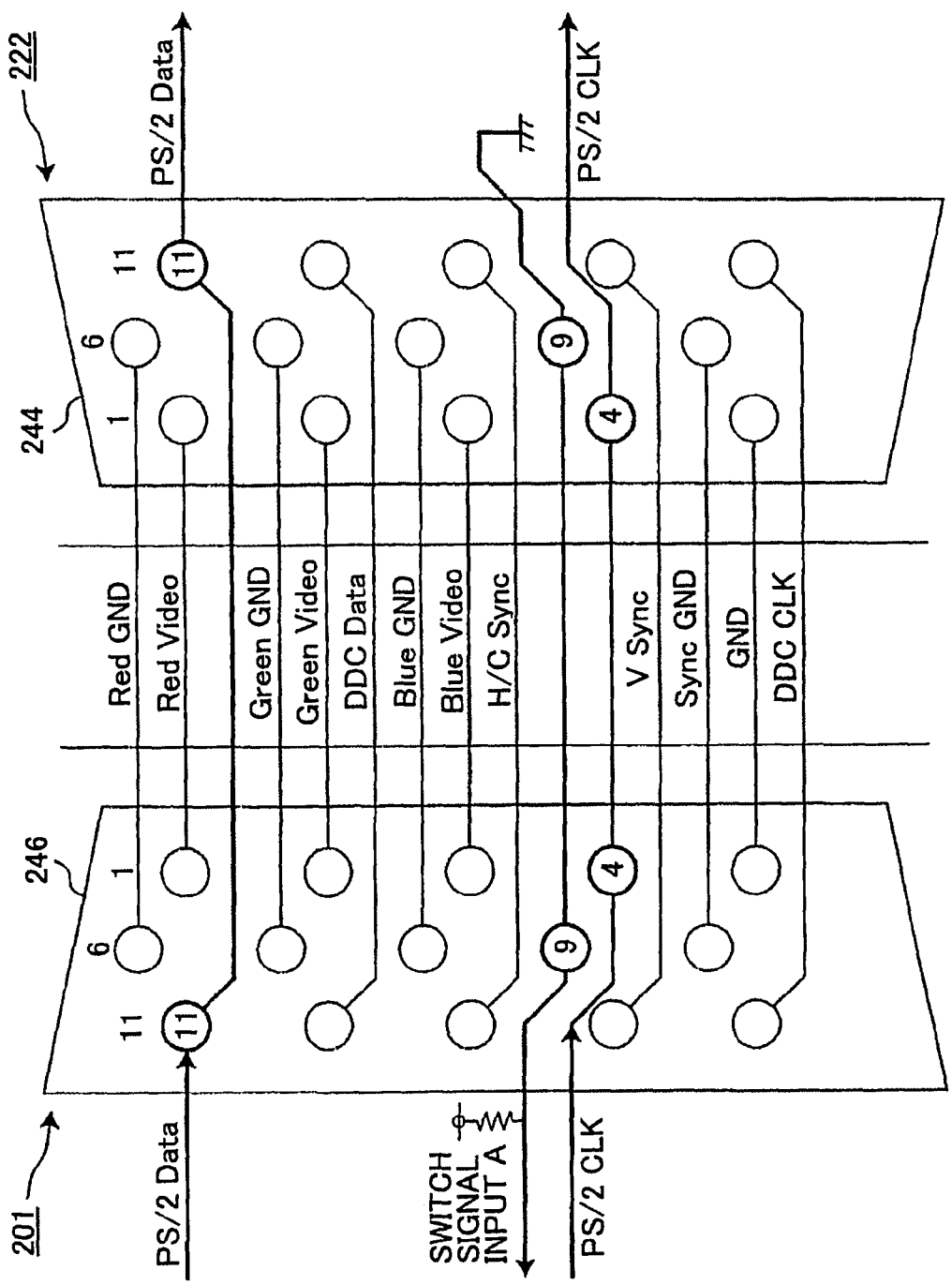
FIG. 40 is a schematic front view of the image signal female connector in a computer and the image signal male connector on the external computer 222 side according to a 24th embodiment of the present invention.

A 24$^{th}$ embodiment of the present invention relates to image signal interface connectors that integrate the features of the fifth, sixth, ninth, tenth, and 12$^{th}$ embodiments. FIG. 40 is a schematic front view of the image signal female connector 246 in the computer 201 and the image signal male connector 244 on the external computer 222 side according to the 24th embodiment of the present invention. FIG. 41 is a list showing a VGA (VESA DDC) terminal layout according to the 24th embodiment.

According to the 24th embodiment, the +5 VDC terminals of the image signal connectors 244 and 246 are assigned as detection terminals that have a +5 V pull-up resistor and detect connection of the external computer 222. The detection terminals come into contact with each other before all the other terminals come into contact. Therefore, first, the switch signal A 218 that controls the input/output of the image input/output switching unit 206 of the computer 201 changes from "H" to "L." As a result, the image signal output to the external image output device (external monitor) 212 is stopped, so that the image input/output switching unit 206 can switch to "input node." Further, after the terminals of the image signal come into contact, the image signal of the external computer 222 is input to the computer 201 to be displayed on the image output device 202.

Further, by assigning the input device signals of PS/2 CLK and PS/2 DATA to the reserved signal of Terminal 4 and the ID0 signal of Terminal 11, which is normally not used, respectively, it is possible to connect the input device signals of the computer 222 to the external computer 222.

Thus, by assigning input device signals used in the external computer 222 to signals assigned as unused and reserved, and further assigning an input signal that has a pull-up resistor to 5 V power supply and detects connection of the external computer 222 to terminals already assigned as +5 VDC in the image signal interface connectors 244 and 246, it is possible to expand functions while having the same conventional connectors and maintaining compatibility with the existing external image output interface.

According to one embodiment of the present invention, there is provided a computer including a switching part configured to detect a connection of an external computer to the computer upon the connection, and to determine, in response to the detection of the connection of the external computer, that an output signal of the external computer be received and output to an output part of the computer.

According to one embodiment of the present invention, there is provided a computer, wherein a connection of an external computer to the computer is detected upon the connection, and it is determined, in response to the detection of the connection of the external computer, that a signal input through an input part of the computer be input to the external computer.

According to one embodiment of the present invention, there is provided a computer including a switching part configured to detect a connection of an external computer to the computer upon the connection; and to determine, in response to the detection of the connection of the external computer, that an output signal of the external computer be received and output to an output part of the computer, and a signal input through an input part of the computer be input to the external computer.

According to one embodiment of the present invention, there is provided a computer including a main body and an input/output part including an input part and an output part, wherein the input/output part is removably provided on the main body.

According to one embodiment of the present invention, there is provided a computer including a main body and an input/output part including an input part and an output part, the input/output part being removably provided on the main body, wherein the input/output part includes a processor including a peripheral device controller, the processor having a processing function as a computer, the processor being configured to be remotely connectable to the main body through data communications.

According to one aspect of the present invention, it is possible to improve the performance of a computer with respect to power consumption, weight, volume, security, and remote operation at the time of its operation. Further, it is also possible to improve the performance of the computer with respect to partial replaceability at the time of failure.

The present invention is not limited to the specifically disclosed embodiments, and variations and modifications may be made without departing from the scope of the present invention.

The present application is based on Japanese Priority Patent Application No. 2006-049965, filed on Feb. 27, 2006, the entire contents of which are hereby incorporated by reference.

What is claimed is:

1. A computer system, comprising:
   a first body, including a first processor located within said first body, said first body having structure without an alpha-numeric display; and
   a second body including a user interface and a second processor located within the second body, the second body being removably attachable to the first body, the second body operating as a computer independently of the first body when unconnected from the first body,
   wherein the user interface of the second body is a display for the first body, when the first body is connected to the second body, and
   wherein the first body is configured to serve as a docking station for the second body, and
   wherein the first body utilizes only a display of the second body, when the first body is connected to the second body,
   wherein the second body includes a peripheral device controller, the second body having a processing function as a computer, the second processor being configured to be remotely connectable to the first body through data communications,
   wherein the second body is configured to remotely log off the first body automatically upon recognizing that the user interface is being attached to the first body, and to remotely log on the first body automatically upon recognizing that the user interface is being detached from the first body.

2. The computer system as claimed in claim 1, further comprising:
   a switching part configured to detect a connection of an external computer to the computer system upon the connection; and to determine, in response to the detection of the connection of the external computer, that an output signal of the external computer be received and output to an output part, and a signal input through an input part be input to the external computer.

3. The computer system as claimed in claim 2, wherein:
   a connection of the external computer to the computer system is detected upon the connection; and it is determined, in response to the detection of the connection of the external computer, that the signal input through the input part of the computer system be input to the external computer.

4. The computer system as claimed in claim 2, wherein:
   when another computer is connected as the external computer to the computer system, a signal indicating the connection is provided to the computer system.

5. The computer system as claimed in claim 1, wherein the second processor includes a peripheral device controller.

6. The computer system as claimed in claim 1, wherein the second body is configured to detect an attachment of the second body to the first body upon the attachment, and to detect a detachment of the second body from the first body upon the detachment, the computer system further comprising:

a switching part configured to determine, in response to the detection of the attachment of the second body to the first body, that an output signal of the first body be received and output to a display of the user interface, and a signal input through an input device of the user interface be input to the first body; and to determine, in response to the detection of the detachment of the second body, that an output signal of the second processor be output to the display of the user interface, and the signal input through the input device of the user interface be input to the second processor.

7. The computer system as claimed in claim 1, wherein in a case of performing a remote connection of the second body to the first body through the data communications, the remote connection is performed after the first body in one of a shutdown state, a suspended state, and a hibernation state is started or returned to operation in response to a remote start packet transmitted to the first body from the second body.

8. The computer system as claimed in claim 7, wherein the first body notifies the second body of the returning to operation after the first body receives the remote start packet from the second body and is returned.

9. The computer system as claimed in claim 8, wherein the first body recognizes one of a real secondary storage unit and a virtual secondary storage unit managed by the second body as a secondary storage unit through the data communications.

10. The computer system according to claim 1, wherein:
    the user interface of the second body is also an input device for the first body, when the first body is connected to the second body.

11. The computer system according to claim 1, wherein:
    the second processor is lower in power consumption than the first processor.

12. The computer system according to claim 1, wherein operation of the second processor is suspended in response to the second body being docked to the first body, and operation of the first processor is suspended in response to the second body being disconnected from the first body.

\* \* \* \* \*